(12) United States Patent
Mazur et al.

(10) Patent No.: US 12,554,239 B2
(45) Date of Patent: Feb. 17, 2026

(54) POWER CONTROL MODULE FOR INDUSTRIAL POWER SYSTEM MANAGEMENT

(71) Applicant: Rockwell Automation Technologies, Inc., Mayfield Heights, OH (US)

(72) Inventors: David C. Mazur, Mequon, WI (US); Andrew J. Schaeffler, Whitefish Bay, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1021 days.

(21) Appl. No.: 17/686,080

(22) Filed: Mar. 3, 2022

(65) Prior Publication Data

US 2023/0140982 A1 May 11, 2023

Related U.S. Application Data

(60) Provisional application No. 63/276,265, filed on Nov. 5, 2021.

(51) Int. Cl.
*G05B 19/05* (2006.01)
*G05B 19/418* (2006.01)
*G06F 1/3206* (2019.01)

(52) U.S. Cl.
CPC .......... *G05B 19/05* (2013.01); *G05B 19/054* (2013.01); *G05B 19/056* (2013.01);
(Continued)

(58) Field of Classification Search
CPC .... G05B 19/05; G05B 19/054; G05B 19/056; G05B 19/058; G05B 19/4185; G05B 19/4188; G05B 19/41885; G06F 1/3206
(Continued)

(56) References Cited

U.S. PATENT DOCUMENTS 6,901,316 B1 * 5/2005 Jensen ............... G05B 19/0426
700/286
7,146,231 B2 12/2006 Schleiss et al.
(Continued)

OTHER PUBLICATIONS

Hartmann, Wayne G. "Simplifying and Enhancing Automated Source Transfer Using Protection with PLC Capabilities." 2006 Power Systems Conference: Advanced Metering, Protection, Control, Communication, and Distributed Resources. IEEE, 2006. (Year: 2006).*
(Continued)

*Primary Examiner* — Mohammad Ali
*Assistant Examiner* — Joshua T Sanders

(57) ABSTRACT

Systems, methods, and devices are disclosed herein for the integrated design and deployment of process control logic and power control logic in the context of industrial automation environments. In an implementation, a programmable logic controller executes power control logic to control a power control module on the network of the electrical subsystem of an industrial automation process. The power control module relays electrical device information to the programmable logic controller which issues power control commands according to the power control logic. The power and process control logic executed by the programmable logic controller are designed in an integrated design environment which includes representations of process control logic for controlling manufacturing devices of the industrial automation process and of power control logic for controlling electrical devices in the industrial automation process.

17 Claims, 33 Drawing Sheets

(52) U.S. Cl.
CPC ....... *G05B 19/058* (2013.01); *G05B 19/4185* (2013.01); *G05B 19/4188* (2013.01); *G05B 19/41885* (2013.01); *G06F 1/3206* (2013.01); *G05B 2219/14006* (2013.01); *G05B 2219/15097* (2013.01)

(58) Field of Classification Search
USPC .......................................................... 700/79
See application file for complete search history.

(56) References Cited

U.S. PATENT DOCUMENTS

| | | | |
|---|---|---|---|
| 7,237,109 | B2 | 6/2007 | Scott et al. |
| 10,872,044 | B1* | 12/2020 | Campbell ............... G06F 13/20 |
| 2002/0162032 | A1 | 10/2002 | Gundersen et al. |
| 2006/0206217 | A1 | 9/2006 | Fujii |
| 2007/0121265 | A1 | 5/2007 | Hill et al. |
| 2008/0077368 | A1 | 3/2008 | Nasle |
| 2008/0163483 | A1 | 7/2008 | Morgan et al. |
| 2010/0050103 | A1 | 2/2010 | Husoy et al. |
| 2010/0313128 | A1 | 12/2010 | Phillips et al. |
| 2012/0022673 | A1 | 1/2012 | Heller et al. |
| 2012/0078431 | A1* | 3/2012 | Weatherhead ......... G06Q 10/06 700/295 |
| 2013/0035800 | A1* | 2/2013 | Kulathu ................. H02H 7/261 700/295 |
| 2015/0066979 | A1* | 3/2015 | Zhang ................... G06F 16/245 707/769 |
| 2016/0197483 | A1 | 7/2016 | Steinert |
| 2017/0075320 | A1* | 3/2017 | Day ....................... H04J 3/0658 |
| 2017/0097615 | A1* | 4/2017 | Mazur .................... H02J 13/00 |
| 2019/0339682 | A1 | 11/2019 | Weinrich |
| 2020/0050753 | A1 | 2/2020 | Davis et al. |
| 2020/0089183 | A1 | 3/2020 | Kallikuppa et al. |
| 2020/0125060 | A1 | 4/2020 | Fujimura |
| 2021/0216306 | A1 | 7/2021 | Moeller |
| 2022/0171636 | A1 | 6/2022 | Kojima |
| 2023/0092247 | A1 | 3/2023 | Sayyarrodsari et al. |
| 2023/0144682 | A1 | 5/2023 | Mazur et al. |
| 2023/0148090 | A1 | 5/2023 | Mazur et al. |

OTHER PUBLICATIONS

IGrid T&D "What is GOOSE Messaging" website, (2021), https://www.igrid-td.com/smartguide/iec61850/goose-messaging/ retrieved from: https://web.archive.org/web/20210614120612/https://www.igrid-td.com/smartguide/iec61850/goose-messaging/ on Jul. 25, 2025 (Year: 2021).*

Non-final Office Action in mailed in U.S. Appl. No. 17/686,086, mailed Mar. 14, 2024, 23 pages.

Peng et al., "Implementing automatic transfer scheme in a main-tie-main configuration using IEC 61850," 2017 IEEE Power & Energy Society Innovative Smart Grid Technologies Conference ISGT, IEEE, Apr. 2017, pp. 1-7.

Final Office Action in U.S. Appl. No. 17/686,088, mailed May 28, 2024, 13 pages.

Non-Final Office Action issued by the USPTO on Dec. 7, 2023 in U.S. Appl. No. 17/686,088, 11 pages.

* cited by examiner

FIG. 10

| Load Shed | | | |
|---|---|---|---|
| Shed Complete | | | |
| Priority | Load | Status | Available |
| 1 | W20-BR117 | Shed | |
| 2 | W20-BR236 | Shed | x |
| 3 | W20-BR288 | Shed | x |
| 4 | S17-BR080 | Disabled | x |
| 5 | S17-BR156 | Shed | x |
| 6 | S09-BR047 | Shed | |
| 7 | S08-BR172 | Available | |
| 8 | S24-BR076 | Available | |
| 9 | W32-BR021 | Initiated | x |
| 10 | W21-BR204 | Available | |
| 11 | W19-BR069 | Available | |
| 12 | W14-BR059 | Disabled | x |
| 13 | W20-BR175 | Available | |
| 14 | W19-BR208 | Available | |
| 15 | W32-BR118 | Available | |
| 16 | S18-BR032 | Available | |

| Priority | Load | Status | Available |
|---|---|---|---|
| 17 | S09-BR056 | Available | |
| 18 | W20-BR081 | Available | |

Load Shed Configuration
Load Priority: 18
Load Name: W20-BR081

Spinning Reserve  950.00   Amount to Shed     93.75
Consumed Load   1025.00   Remaining to Shed  93.75

Number of loads in this group: 18
Additional kW to Shed (%): 25

FIG. 11

POWER CONTROL MODULE FOR INDUSTRIAL POWER SYSTEM MANAGEMENT

CROSS-REFERENCE TO RELATED APPLICATIONS

The present application claims priority to U.S. Provisional Patent Application No. 63/276,265, "INTEGRATED PROCESS AND POWER CONTROL FOR INDUSTRIAL AUTOMATION ENVIRONMENTS," filed Nov. 5, 2021 which is hereby incorporated herein by reference in its entirety.

TECHNICAL FIELD

Various implementations disclosed herein relate to industrial automation technology, and, to the dynamic discovery, visualization, and integration and control of electrical assets.

TECHNICAL BACKGROUND

Industrial automation processes (IAPB) involve multiple interconnected and inter-operational devices and machinery that perform many manufacturing functions such as raw-material handling, fabrication tasks, quality control testing, and packaging. The interoperability of these multiple devices relies on automation technology to coordinate the processes and to provide engineers and plant managers with production data and monitoring capabilities.

Industrial controllers employ process logic to control the operation of an industrial automation process. The process logic may be developed within the context of a development environment that allows an industrial engineer to program a control strategy for a process. The development environment may also include tools for designing HMI views. The process logic, when deployed to a controller, functions to direct the machine elements that ultimately perform an industrial process, while taking in data from sensors and supplying information to HMIs.

Industrial automation environments also rely on a power control plane comprising the electrical subsystem or electrical device network of the environment. This is a critical aspect of an IAP because mismanagement of the electrical device network during an emergency may result not only in substantial losses of capital equipment but also economic losses due to degraded or lost manufacturing capacity. The electrical device network of an industrial automation process is typically controlled by a power control module (PCM) conforming to the IEC 61850 protocol. PCMs range in sophistication from having a basic set of hard-wired control settings for rudimentary manufacturing processes to programmable high-capacity modules capable of controlling the hundreds of intelligent electrical devices which power highly sophisticated automated manufacturing processes.

Separate tools are used to develop logic for implementing a power control strategy for the power control plane, which can then be deployed to management nodes connected to circuit breakers, switches, and other intelligent electrical devices on a power network. Such logic governs the order in which load is shed in the event of power fluctuations or failures.

Overview

Systems, methods, and devices are disclosed herein for the integrated design and deployment of process control logic and power control logic in the context of industrial automation environments. In an implementation a computer displays, in an integrated design environment, representations of process control logic for controlling manufacturing devices an industrial automation process and of power control logic for controlling electrical devices in the industrial automation process. The computer further deploys the process control logic and the power control logic to a programmable logic controller (PLC) that controls the industrial automation process.

In an implementation of the technology, a programmable logic controller executes process control logic to control manufacturing devices associated with an industrial automation process and executes power control logic to control electrical devices associated with the industrial automation process.

In another implementation of the technology, a power control module receives data from electrical devices in an industrial automation process and passes the data to a programmable logic controller that controls the industrial automation process. The power control module also receives instructions from the programmable logic controller and controls the electrical devices based at least in part on the instructions.

In another implementation of the technology, a human-machine interface (HMI) device displays objects corresponding to manufacturing devices associated with the industrial automation process and to electrical devices associated with the industrial automation process; receives user input with respect to the second objects; and communicates the user input to a programmable logic controller that controls the industrial automation process.

In yet another implementation of the present technology, an industrial automation control system comprises a programmable logic controller (PLC) and a power control module. The PLC executes process control logic to control manufacturing devices associated with an industrial automation process and executes power control logic to generate instructions for managing electrical devices associated with the industrial automation process. The power control module controls the electrical devices based at least in part on the instructions generated by the programmable logic controller.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 10 illustrates a user interface view of a load shed table after automatic discovery and population in an implementation.

FIG. 11 illustrates a user interface view of a load shed priority table for a control system of a large-scale IAP in an implementation.

Figure 1:
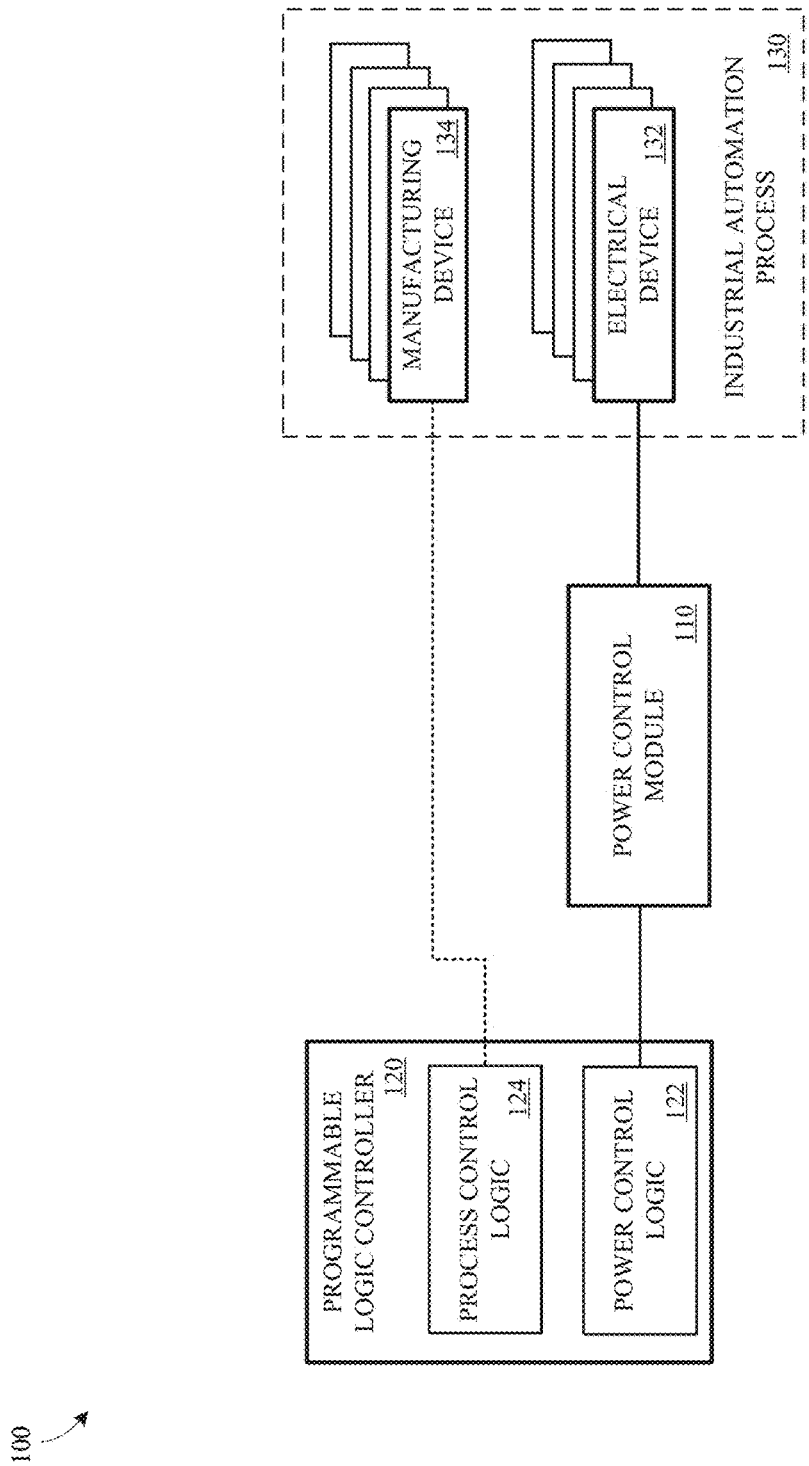
FIG. 1 illustrates a control architecture for an industrial automation process in an implementation.

The drawings have not necessarily been drawn to scale. Similarly, some components and/or operations may be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

In complex industrial manufacturing and processing environments, process control is managed by industrial automation technology. In a typical process automation control system, multiple industrial devices or machinery are connected to a programmable controller which is programmed to monitor and control the system. The controller monitors information about the devices concerning a variety of operational characteristics, such as operating speed, temperature and/or pressure data, power consumption, and the like, which are pertinent to the device- and process-level operation. Such programmable controllers can be programmed to control, for example, the start-up and shut-down sequences of multiple interconnected devices in an industrial process and can respond to contingent or urgent situations based on programmed control logic.

A key subsystem of an industrial process is the electrical network connecting the industrial devices or loads and on-site or off-site power sources. These industrial devices or loads are connected to the electrical network through dedicated circuit breakers. As the automated process is in operation, if there is a catastrophic electrical event such as a ground fault, immediate intervention would be required. However, typical programmable controllers lack the programming to control the electrical power subsystem as well as the ability to provide a high-speed response. This creates a fragmented situation of having two distinct control environments for an industrial automation process, one for process control and another for power control. Further, power control programming for handling these responsibilities is typically distinct in design and in operation from process control systems, are typically implemented in a different device from a programmable controller and must be manually configured.

The present technology includes an automation control system whereby power control programming is integrated into process control software. The automation technology allows a control engineer to design power control logic which the controller may implement for power control along with the process control as the industrial automation process is in operation. The power control logic can include programs designed, for example, for open or closed transitions for main-tie-main breaker redundancy configurations, for high-speed load shedding operations, and for running simulations of power control programs.

The automation technology also obviates the need for a control engineer to physically gather electrical device data from multiple assets (in complex manufacturing environments, such devices can number in the hundreds), and manually upload such data into a control program; instead, the automation technology automatically discovers all electrical devices on the electrical network and populates the design software with the devices as well as device attributes or properties which the control engineer can use for control programs. The automation technology may also provide the programmable logic controller with the ability to respond at high-speed to catastrophic or imminently catastrophic electrical events. The automation technology may also allow plant or factory personnel to control not only the automated process but also the power to electrical devices in the process via human-machine interface devices, such as wireless tablets, from locations remote from those devices. And, just as a process control system can be visually displayed on devices remote from the plant or factory floor that are connected by an IT network to the programmable logic controllers, so too, can the power control system be displayed on remote devices.

For a programmable logic controller to provide a high-speed response in the event of an electrical event, the automation technology further provides channel prioritization whereby the programmable logic controller has both low-speed and high-speed channels by which to communicate with an electrical power control unit. In the channel prioritization technology, low priority tasks are allocated to low-speed asynchronous channels, while high-priority, mission-critical tasks are dedicated to high-speed synchronous channels. In an implementation of the present technology, the low-priority tasks such as transmitting telemetry data and other housekeeping activities are handled by the asynchronous channels and occur at regular intervals, while high-priority control activities triggered by a change of state of a device in the IAP are handled by the synchronous channels. Because information received by the controller from multiple devices in the IAP may arrive at the controller out of the order in which they were sent, the controller must sequence the information before transmitting the information to the power control module or storing the information in a controller data table. Because reading a 64-bit timestamp can consume precious milliseconds in an urgent situation, the sequencing information provided by the controller is in the form of integer values which are faster for the power control module to process.

Turning now to the figures, FIG. 1 illustrates a control system architecture of IAP 130 in an implementation. IAP 130 comprises one or more manufacturing devices 134 and one or more electrical devices 132. IAP 130 may constitute a process for manufacturing goods but may also comprise processes occurring within a utility plant (e.g., a nuclear power plant) or research or laboratory facility (e.g., a sample testing or processing facility). Manufacturing devices 134 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes. Electrical devices 132 typically comprise intelligent electrical devices coupled to manufacturing devices 134. Intelligent electrical devices are devices which can receive commands and send data including status and metering data across a network. For example, electrical devices 132 provide remote access to breaker status, breaker control, and electrical metering data. Electrical devices 132 may be stand-alone devices through which manufacturing devices 134 connect to the electrical network, or they may be integrated into manufacturing devices 134. Each of electrical devices 132 may be coupled to a single manufacturing device 134 or it may be connected to multiple such devices.

In a typical implementation, electrical devices 132 connect to PLC 120 through power control module (PCM) 110. PCM 110 receives and executes power control commands from PLC 120 according to the power control logic 122 of PLC 120. The power control commands may be triggered by events occurring on IAP 130 according to power control logic 122 or may be instigated by plant personnel through a computing device in communication with PLC 120. Plant personnel may monitor and control the electrical network of IAP 130 using computing devices in communication with PLC 120 as it executes power control logic 122. These computing devices may be mobile computing devices such as tablet computers, smartphones, or wearable computing devices, or laptop or desktop computers operating a human-machine interface (HMI). The computing devices receive data from PLC 120 concerning electrical devices 132 and transmit power control commands to PLC 120 for subsequent execution by PCM 110 according to power control logic 122.

Manufacturing devices 134 and electrical devices 132 are controlled by PLC 120 which comprises process control logic 124 and power control logic 122. Process control logic 124 of PLC 120 controls the automated and coordinated operation of manufacturing devices 134 of TAP 130. Process control logic 124 may be designed using any number of programming tools in an integrated design environment such as text-based coding, functional block diagrams, ladder logic, graphics-based programming, or other types of programming interfaces. Process control logic may be designed or programmed on a design computer running the integrated design environment, then transmitted or uploaded to PLC 120. Alternatively, process control logic 124 may implemented with a system of hardware connections in the PLC or in programmable PLC modules by which a PLC can be upgraded to add more control capacity as its industrial automation process grows in sophistication.

In a similar fashion, power control logic 122 for controlling electrical devices 132 of IAP 130 are designed using the programming tools of the integrated design environment such as text-based coding, functional block diagrams, ladder logic, graphics-based programming, or other coding interfaces. Power control logic 122 is designed or programmed in an integrated design environment operating on a design computer, then transmitted or uploaded to PLC 120. Power control logic 122 comprises power control schemas which provide for programmatic or automated operation of electrical devices 132 under normal or other circumstances. For example, power control logic 122 comprises open or closed transitions for main-tie-main schemas, where an electrical source is to be taken on- or off-line and its electrical loads must be transitioned to or from a second source. Power control logic 122 also comprises load-shedding operations for situations where the available power drops and loads must be taken off-line in a controlled manner or, alternatively, preferentially selecting less critical equipment to be taken off-line to ensure that more critical pieces of equipment can continue to operate. Load-shedding operations may also be programmed for routine maintenance operations allowing subsets of manufacturing devices 134 to be taken off-line or online in a controlled manner. Because the need to shed loads can occur for a variety of reasons both routine and unexpected, power control logic 122 may comprise multiple load-shedding schemas, such as taking equipment off-line in the event of a sharp decline in available power, or more simply taking a filling station off-line when a conveyor belt reports an anomaly, for example. Power control logic 122 may also comprise the monitoring and notification of and controlled response to the detection of anomalous behavior of any of manufacturing devices 134 or associated electrical devices 132. For example, in the event of an electrical short occurring at manufacturing device 134 or on an electrical circuit powering a subset of manufacturing devices 134, power control logic 122 may be programmed to provide a high-speed response comprising tripping one or more breakers of the relevant device(s) or circuit, alerting plant personnel to the anomalous behavior and response, and slowing or pausing the other manufacturing devices of IAP 130 until the situation is resolved. PLC 120 can be programmed to transmit such high-speed responses over high-speed synchronous data channels connecting PLC 120 and PCM 110. PCM 110 communicates with electrical devices 132 to receive health and status data of electrical devices 132 (which is then relayed to power control logic 122) or to execute power control commands according to power control logic 122, such as tripping open a breaker where the short has been detected.

In a typical implementation, PCM 110 provides central access to and control of the electrical subsystem of IAP 130 using the IEC 61850 communications protocol. PCM 110 receives from electrical devices 132 data comprising the device's operational capacities, operational status, and other supplemental information such as an identifier and information relating to its associated load. PCM 110 also transmits to electrical devices 132 commands such as for taking the devices on- or off-line. PCM 110 also communicates with PLC 120, transmitting data received from or about electrical devices 132 to PLC 120 and receiving and executing power control commands from PLC 120 according to power control logic 122 of PLC 120's program instructions.

PLC 120 controls electrical devices 132 by sending power control commands to PCM 110 over one or more data channels in an implementation. These data channels support synchronous or asynchronous transmissions. Because serious damage arising from an anomaly such a ground fault can happen in just a few milliseconds, notifications of and responses to such events may be prioritized to occur over the higher-speed synchronous channels connecting PLC 120 to PCM 110 rather than over lower-speed asynchronous channels. Conversely, routine operations such as taking manufacturing devices off-line at the end of the workday can be assigned to lower-speed asynchronous channels running between PLC 120 and PCM 110. In this way, automated response to emergent situations obviates the need for timely human intervention, making plant operation safer. In an implementation, PLC 120 may be connected to multiple power control modules, with power control logic 122 controlling IEDs of the multiple power control modules. In an alternative implementation, PCM 130 may communicate with or receive commands from multiple PLCs.

Figure 2:
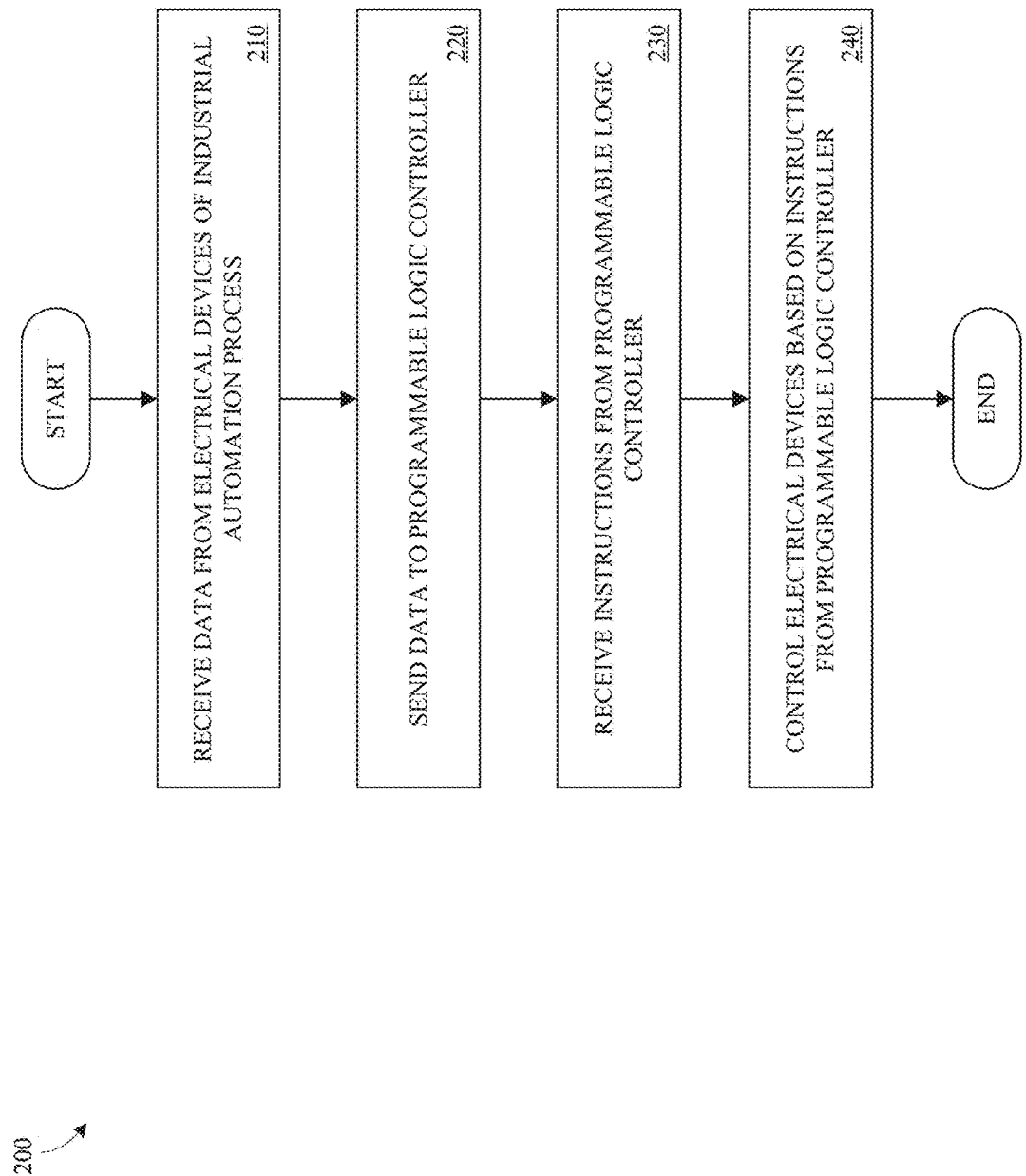
FIG. 2 illustrates a workflow for operating a power control module in an industrial automation process in an implementation.

FIG. 2 illustrates workflow 200 for controlling the electrical network of an industrial automation process by a power control module in an implementation. The operations of FIG. 2 are discussed in the context of the elements of FIG. 1, although other elements discussed herein can instead be employed. PCM 110 receives data from electrical devices 132 of IAP 130 (step 210). Such data may comprise various breaker properties such as an identifier, operational status, electrical capacity, as well as data relating to the load. PCM 110 transmits electrical device 132 data to PLC 120 via synchronous or asynchronous data channels (step 220). PLC 120 processes electrical device 132 data from PCM 110 according to power control logic 122 of its program instructions, and transmits to PCM 110 operating instructions regarding electrical device 132 as necessary. PCM 110 receives instructions from PLC 120 comprising power control commands (step 230) and executes those commands (step 240).

Figure 3:
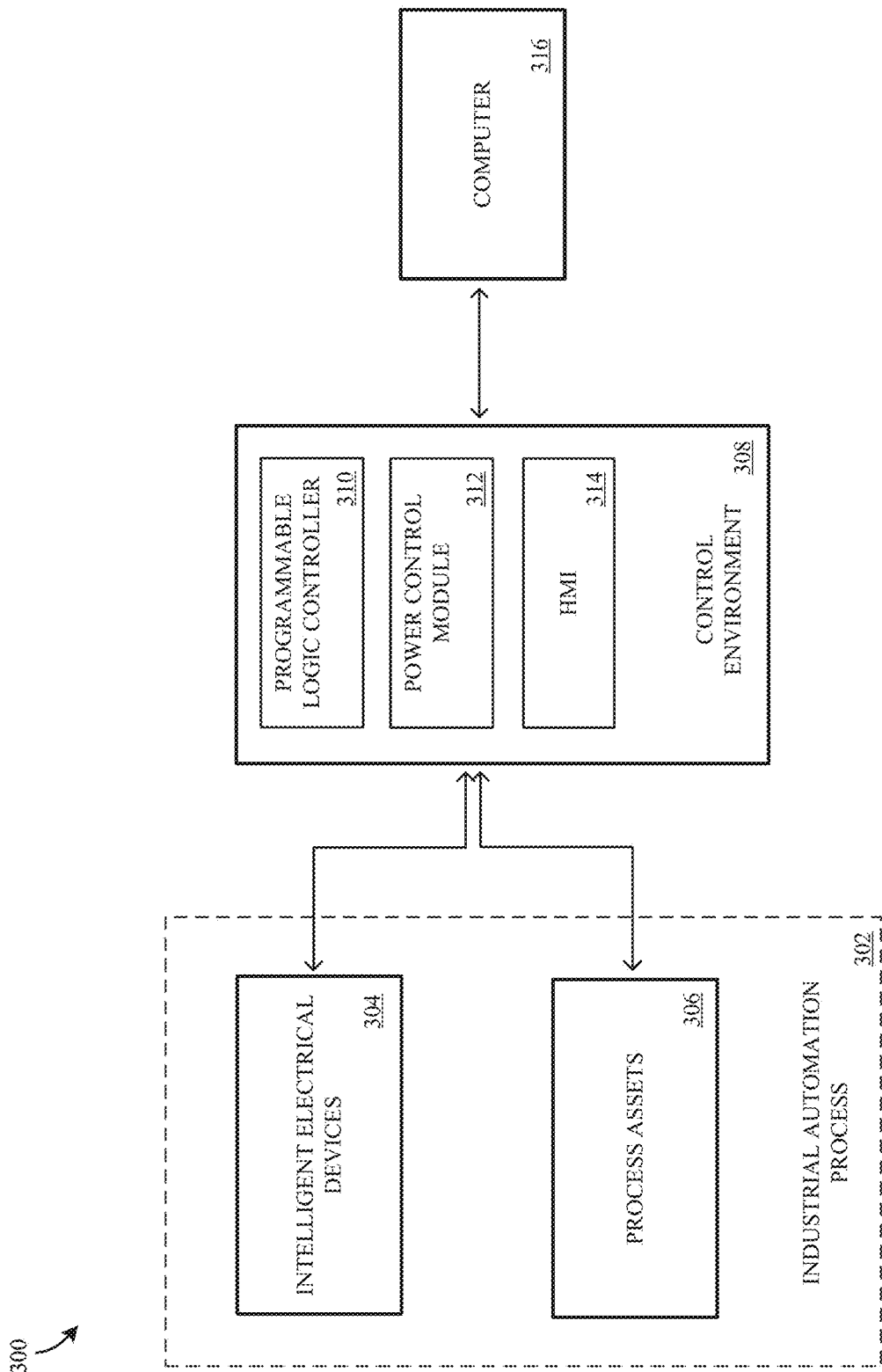
FIG. 3 illustrates a control architecture for an industrial automation process in an implementation.

FIG. 3 provides a broad overview 300 of the control system architecture of an industrial automation process in an implementation. Industrial automation process (IAP) 302 includes process assets 306 and intelligent electrical devices 304. Process assets 306 include factory or industrial machinery or manufacturing equipment such as conveyor belts, robotic devices, packaging devices, processing equipment, mixers, filling stations, quality control devices, etc. Intelligent electrical devices (IEDs) 304 include circuit breakers which connect the assets to the electrical network of the plant and which provide breaker control (e.g., opening or closing a breaker) as well as electrical metering data which may be accessible by remotely located control equipment or computing devices. These breakers may be stand-alone devices through which an asset connects to the electrical network, or they may be integrated into the devices. Process assets 306 and IEDs 304 of IAP 302 are connected to control environment 308 which includes components such as programmable logic controller 310, power control module 312, and one or more HMI devices 314. Within control environment 308, these components may be interconnected, with power control module 312 sending information about IAP 302 components to PLC 310 and receiving process or power control commands from PLC 310. The operation of control environment 308 is designed on computer 316 which provides control software by which a control engineer can program process and power control logic, can deploy those programs to control environment 308 hardware, and can receive information about process assets 306 and IEDs 304 for active control or monitoring.

Figure 4A:
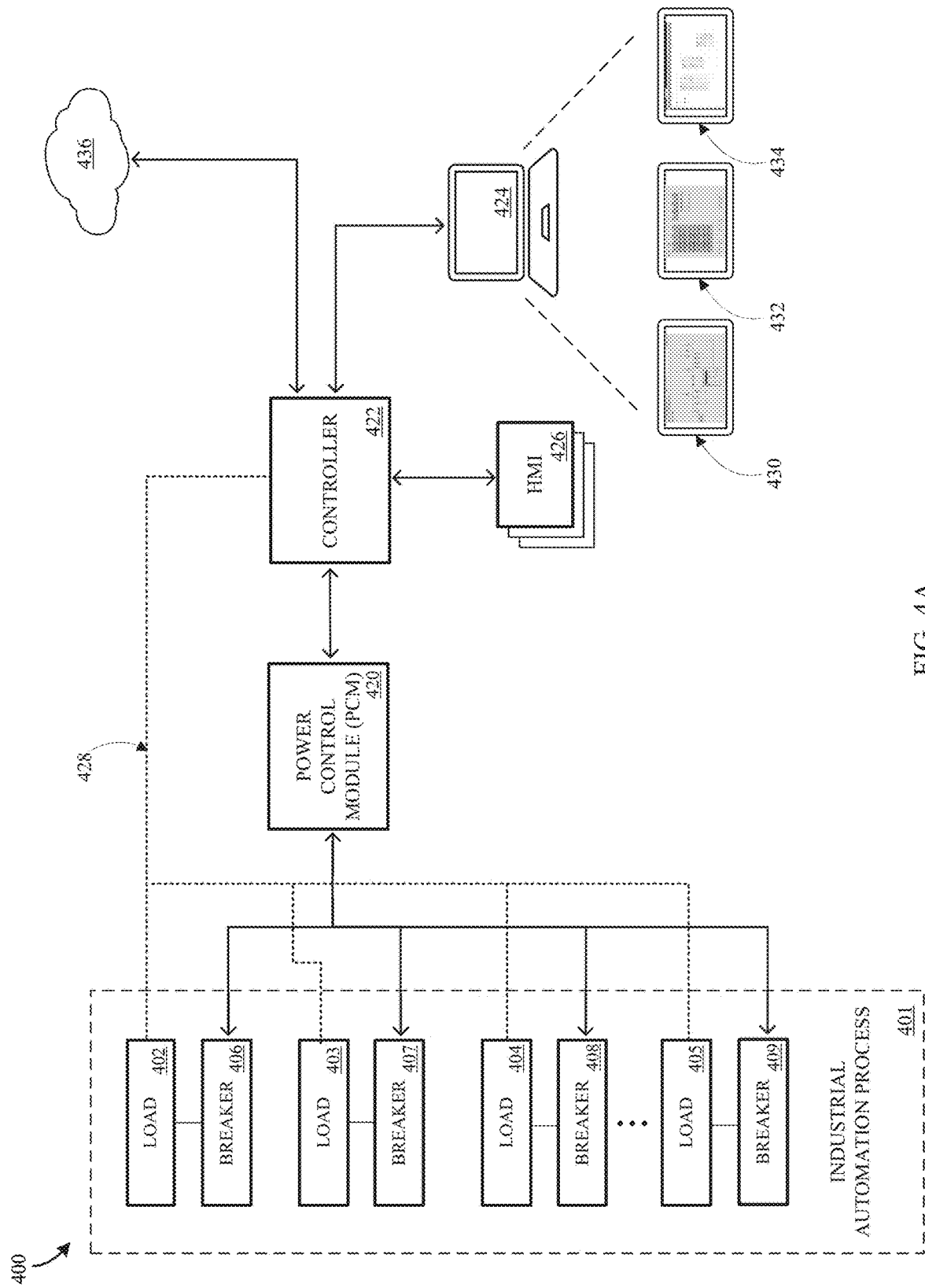
FIG. 4A illustrates a design and control architecture for an IAP in an implementation.

In FIG. 4A, view 400 illustrates an exemplary implementation of the control architecture of TAP 401. TAP 401 comprises various devices or loads: in canning plant, for example devices 402 may be a filling station, a capping station, a labeling station, and so on to the nth load which may be a box sealing machine. Each load or device 402 through 405 is connected to the electrical network of TAP 401 through corresponding circuit breakers 406 through 409. These breakers are connected to power control module 420 which regularly interrogates breakers 406 through 409 on the electrical network to receive electrical data such as current, voltage, frequency, and breaker status, and to which power control module 420 can issue commands, such as opening, closing, resetting, or disabling a breaker. In an implementation of the technology, power control module 420 communicates with breakers 406 through 409 over Ethernet lines using the IEC 61850 communications standard.

Power control module 420 is further operatively coupled to controller 422 which receives and stores control programming for power control and for process control. Controller 422 receives electrical device information from power control module 420 and transmits power control commands to any of breakers 406 through 409 through power control module 420. Controller 422 receives load information and sends process control commands to loads 402 through 405 over control network 428. As a central point of command and control over TAP 401 power and process, controller 422 can provide information to remote devices such as HMIs 426 or to a data storage cloud 436, providing a means for access to controller operations, for example, by enterprise-level computer systems.

Controller 422 connects to computer 424 containing control design software. This control software is the means by which a control engineer can design control programs for an TAP and for its electrical system. View 430 is an exemplary view created by the control software of the electrical network diagram of TAP 406 comprising breakers 406-409 of loads 402-405 and displaying the status of the breakers (e.g., open or closed) as well as breaker parameters such as a device name and power drawn or current drawn. In this view, a control engineer can monitor the electrical system and can issue commands to breakers 406-409 displayed in that view. View 432 is an exemplary view of breakers 406-409 of TAP 401 that have been automatically discovered by the control software along showing breaker name, status, and shed priority. In this exemplary implementation, breakers 406-409 are listed in a table in order of shed priority from highest priority to lowest, where in the event of an emergency high-speed load-shed operation, the breaker of breakers 406-409 with shed priority of "1" will be shed first, and shedding will continue until the power consumption of IAP 401 falls below the available power, also known as the "spinning reserve." View 434 is an exemplary view of a functional block diagram program in an integrated design environment by which a control engineer programs process control logic and power control logic. After programming the control logic, the program is deployed to controller 422 to control IAP 401.

Figure 4B:
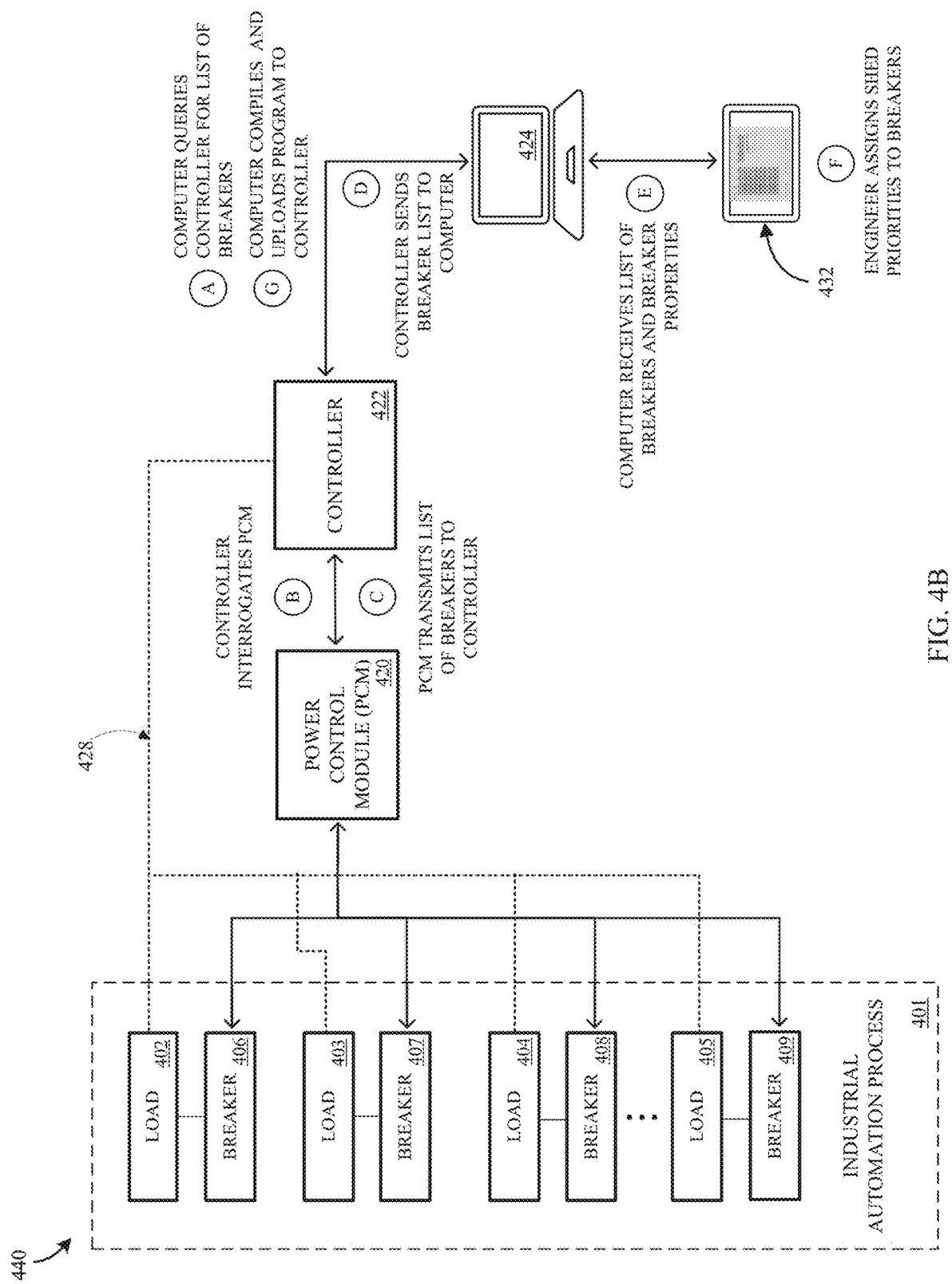
FIG. 4B illustrates a control architecture and process for designing a load-shedding schema of an IAP in an implementation.

In FIG. 4B, IAP 401 is shown in architectural view 440 during the design phase of the integrated power control system. In step A, computer 424 queries controller 422 for a list of breakers on IAP 401's electrical network along with breaker information including breaker identifiers, status, power consumption, shed priority, trip coil status, and the like. In step B, controller 422 interrogates power control module 420 for breaker information. In step C, power control module 420 transmits breaker information to controller 422, which in step D is transmitted to computer 424. Computer 424 receives this information and populates view 432 with a list of breakers 406-409 along with identifiers, status, and shed priority. The control engineer in step F can monitor and/or re-assign shed priorities of the breakers as the engineer deems appropriate for a high-speed load-shedding operation. For example, in a situation where available power precipitously declines, the engineer may assign higher priority to more valuable equipment if the loss of or damage to that equipment would be of greater consequence to plant operations, or alternatively, the engineer may assign higher priority to devices of lesser importance so that more important devices can continue to operate. In step G, once the programming is complete, the computer deploys the control program to controller 422.

Figure 4C:
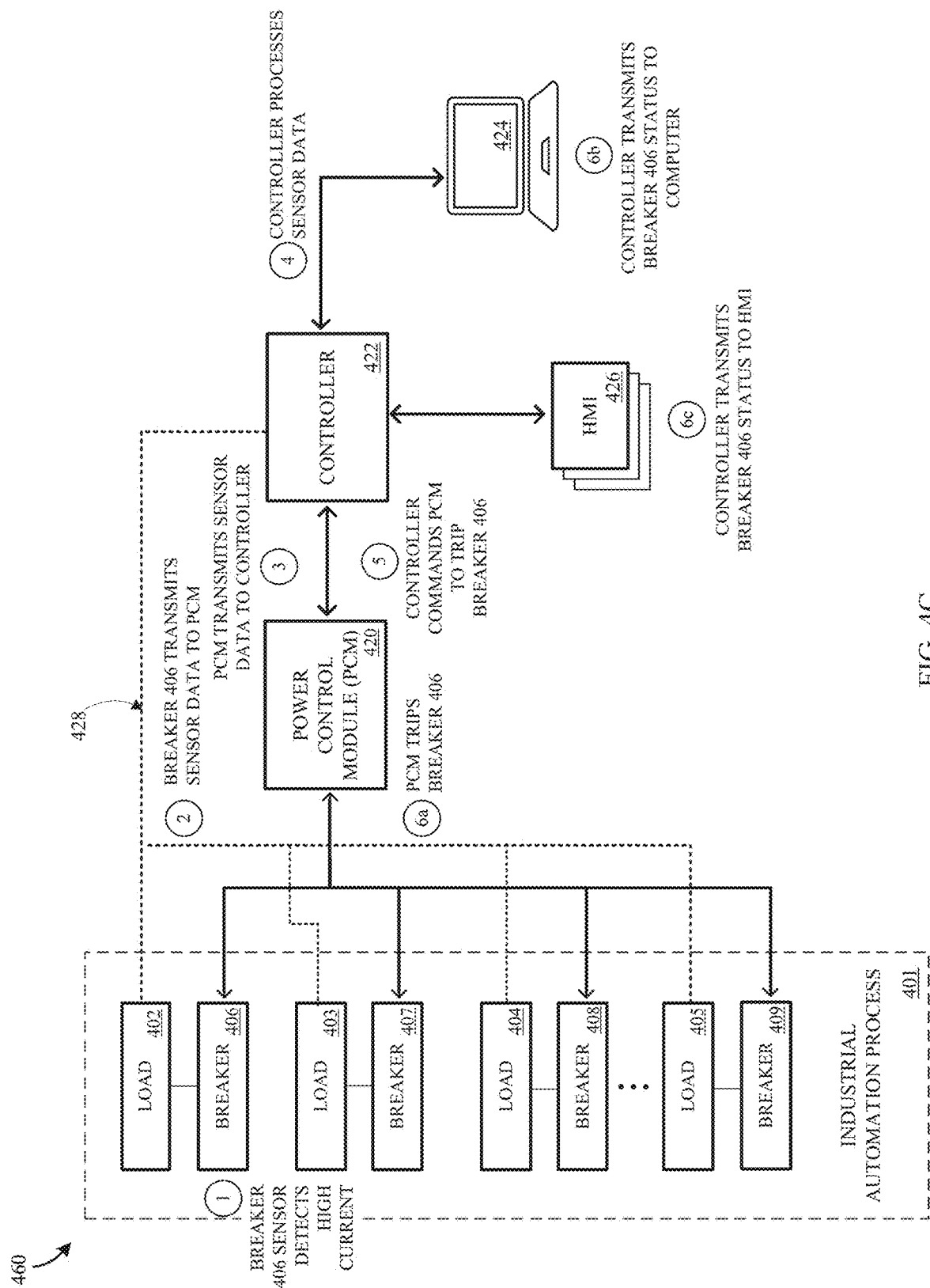
FIG. 4C illustrates a control architecture and a load-shedding operation of an IAP in an implementation.

FIG. 4C illustrates an exemplary architectural view 460 of IAP 401 as IAP 401 is controlled by controller 422 when an electrical ground fault occurs at load 402 in IAP 401. An electrical current sensor of breaker 406 detects and transmits current data to power controller module 420. Power control module 420 sends the data to controller 422 which determines that a fault is occurring at breaker 406. Controller 422 commands power control module 420 to trip or open breaker 406, effectively taking load 402 off-line. Controller 422 also displays the fault information as well as breaker status information to computer 424, to remote HMI devices 432, and to cloud storage 436.

Figure 4D:
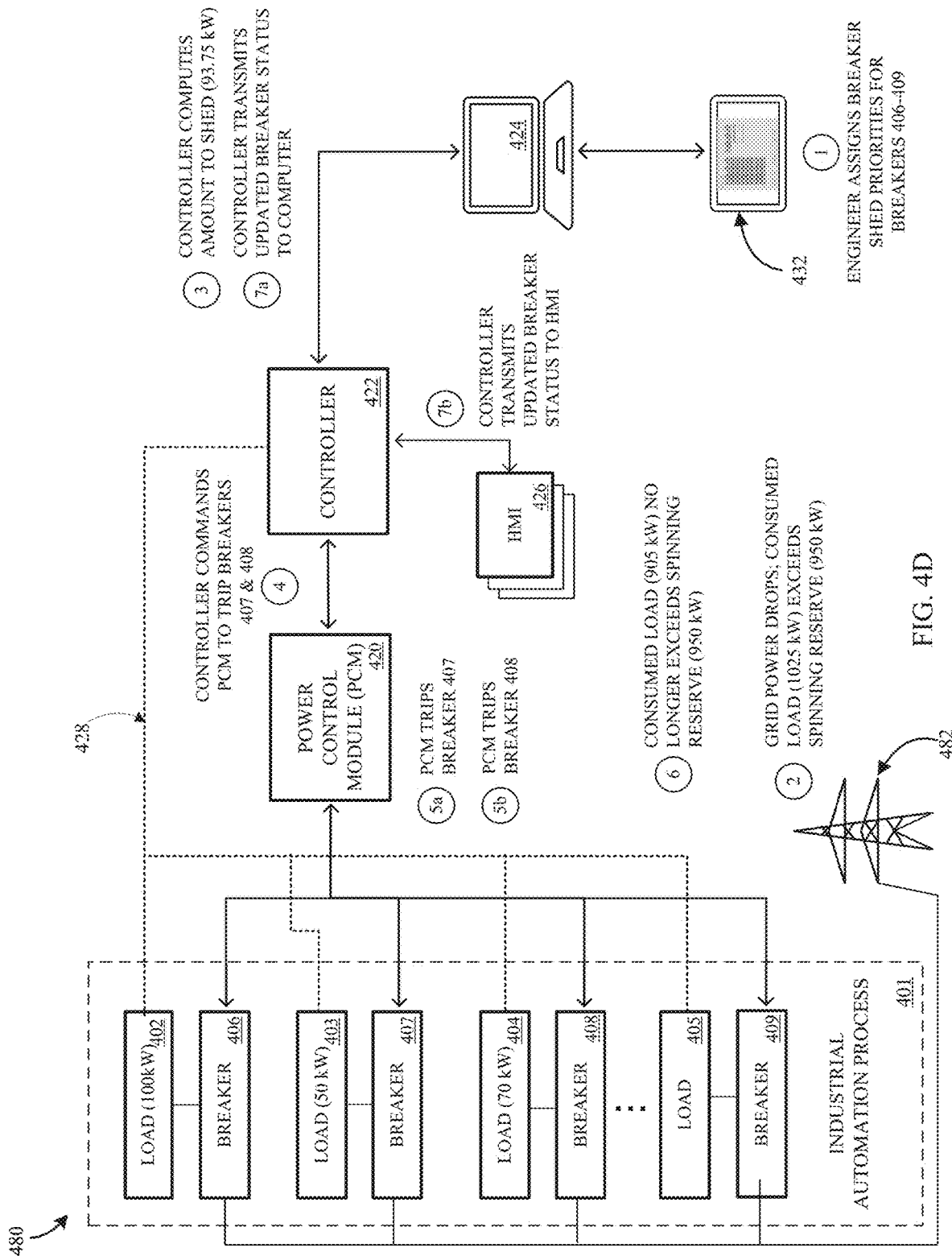
FIG. 4D illustrates a control architecture a load-shedding operation involving multiple breakers of an IAP in an implementation.

FIG. 4D illustrates an exemplary architectural view 480 of IAP 401 as IAP 401 is under control of controller 422. A control engineer has assigned shed priorities to breakers 406-409 such that breaker 407 has a shed priority of "1"; breaker 408 has a shed priority of "2"; and breaker 406 has a shed priority of "3." After the control program is deployed to and runs on controller 422, the engineer then arms or activates a load-shedding program of the control program. Next, as IAP 401 is operating under the control of the control program, a precipitous drop in grid power 482 occurs resulting in the power consumption of IAP 401 exceeding the spinning reserve by 75 kW. Controller 422 detects the total power consumption of IAP 401 and the spinning reserve, then runs the load-shedding algorithm. The load-shedding algorithm is programmed to shed 125% of the excess power consumption or, in this example, about 94 kW. Controller 422 commands power control module 420 to trip breaker 407 for which load 403 is consuming 50 kW. Controller then commands power control module 420 to trip breaker 408 for which load 404 is consuming 70 kW. At this point, 120 kW have been shed, and power consumption of IAP 401 is now less than the spinning reserve. Controller 422 transmits the status of IAP 401 to computer 424 and remote HMI devices 426.

Figure 5A:
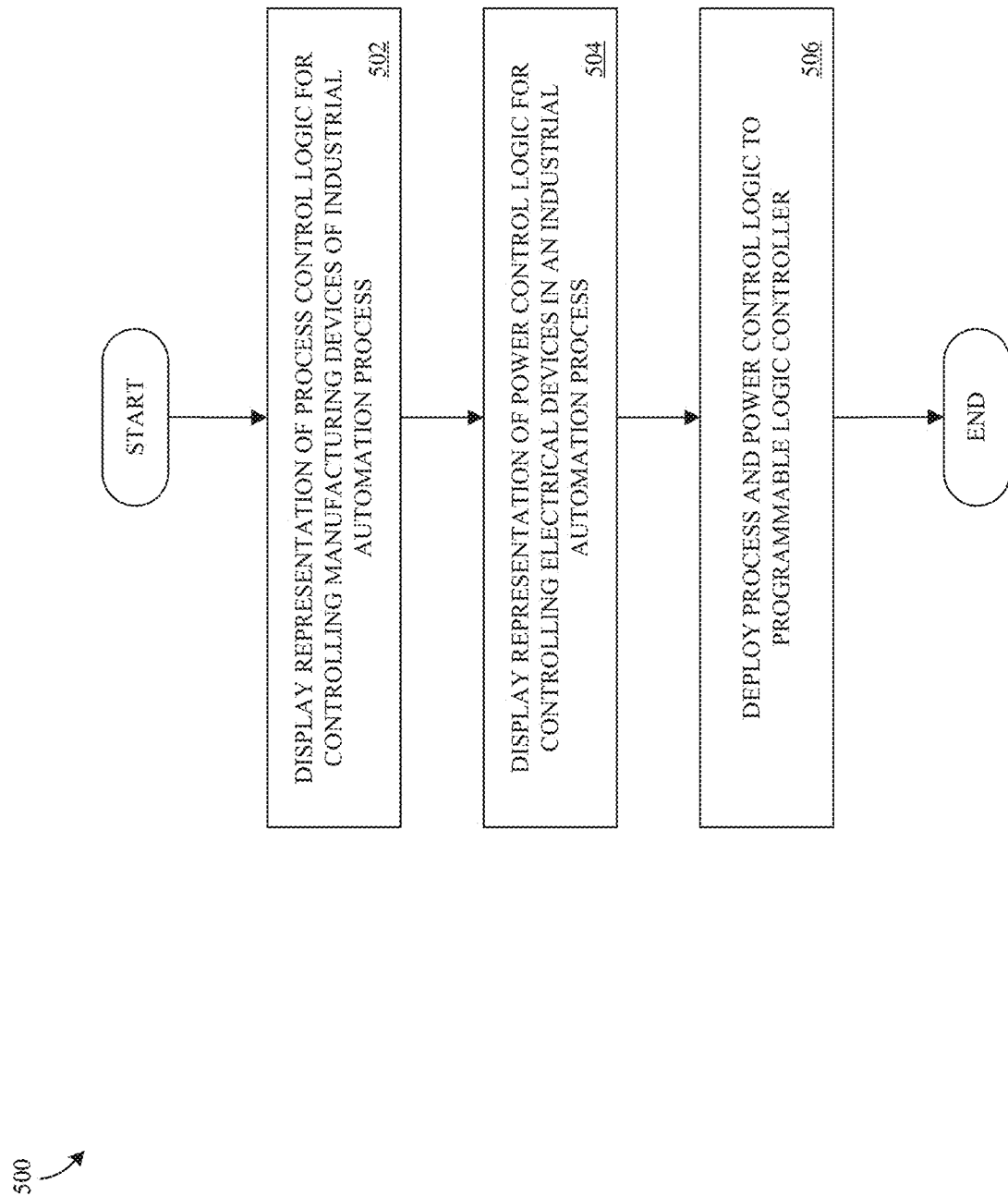
FIG. 5A illustrates a workflow of a design computer of an IAP in an implementation.

Turning now to the workflow diagrams, FIG. 5A illustrates workflow 500 for operating a computer during control software programming in an implementation. In 502, the computer running an integrated design environment for designing power and process control of an IAP displays a representation of process control logic. In 504, the computer displays a representation of power control logic. These representations may be functional block diagrams, a ladder logic diagram, a text-based program, or some other software programming environment. It may be appreciated by those knowledgeable in the field that step 504 can occur before step 502. In step 506, the process control logic and the power control logic are deployed to a programmable logic controller.

Figure 5B:
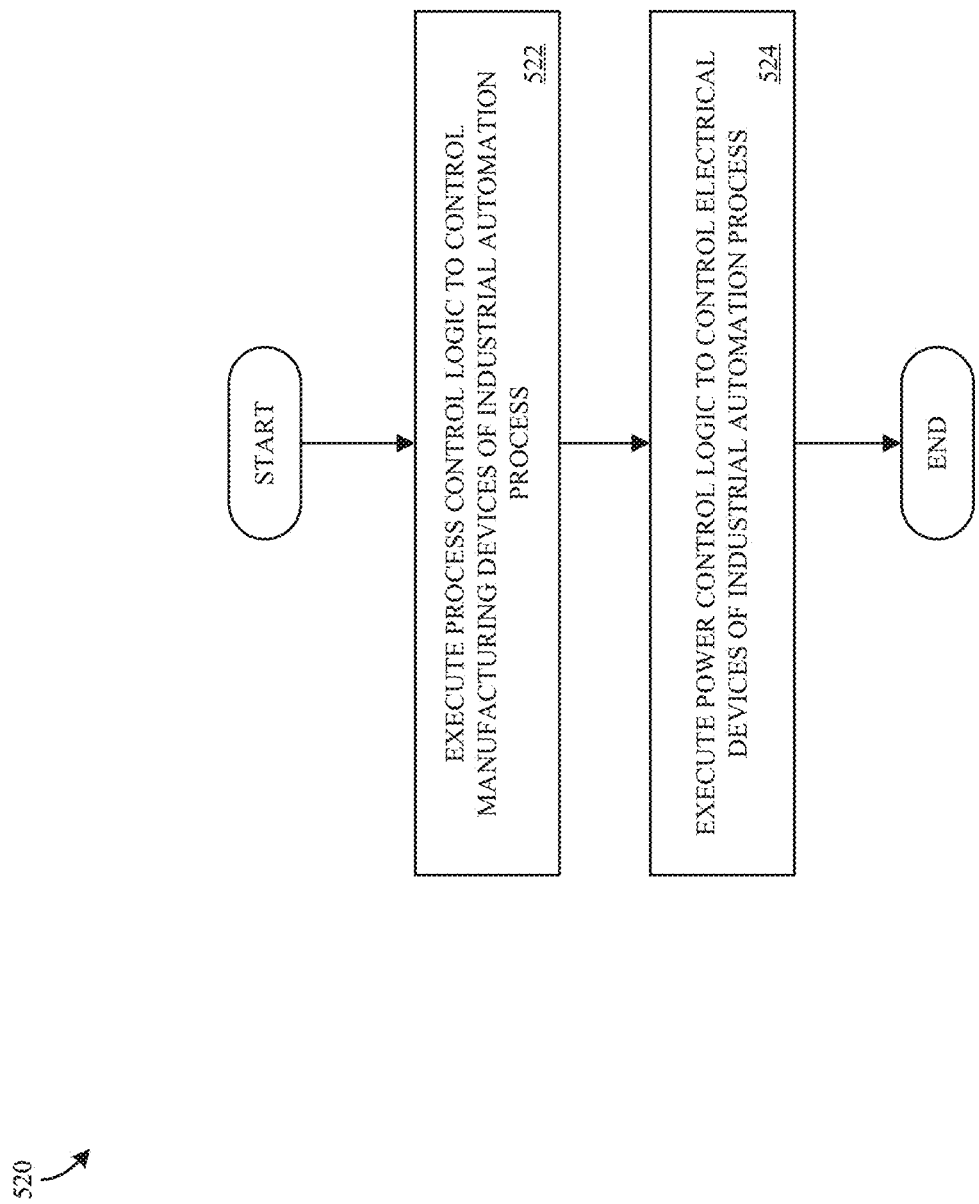
FIG. 5B illustrates a workflow of a programmable logic controller of an IAP in an implementation.

FIG. 5B illustrates exemplary workflow 520 of a programmable logic controller during IAP operation. In step 522, the programmable logic controller operatively coupled to the manufacturing devices of the IAP executes process control logic to control those devices. In step 524, the programmable logic controller executes power control logic to control the electrical devices of the IAP. It may be appreciated by those knowledgeable in the field that step 524 can occur before or concurrently with step 522.

Figure 5C:
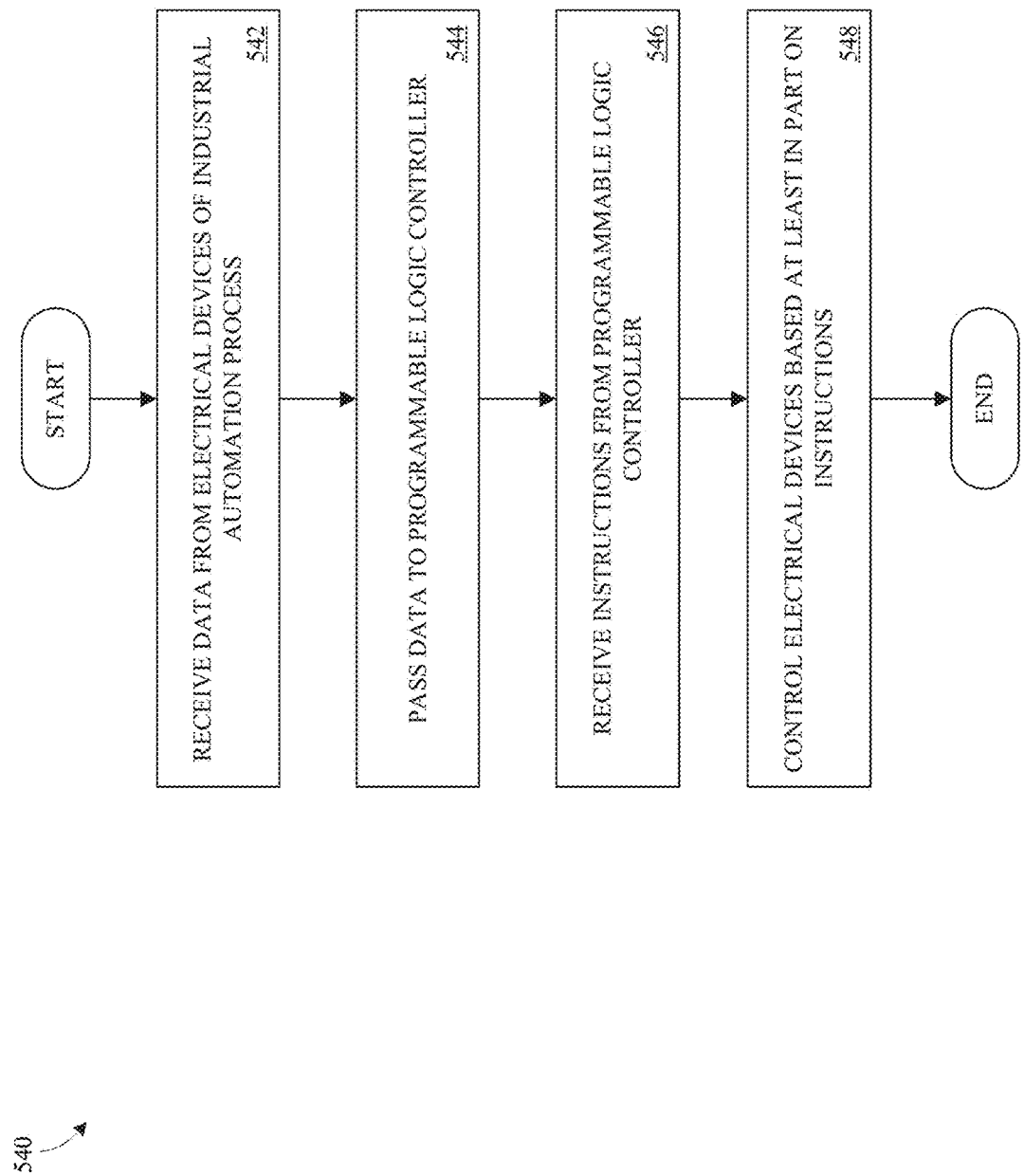
FIG. 5C illustrates a workflow of a power control module of an IAP in an implementation.

FIG. 5C illustrates exemplary workflow 540 of a power control module during IAP operation, where a programmable logic controller is operatively coupled to the power control module which is further connected to the network of IAP electrical devices. In step 542, the power control module receives data from the electrical devices of the IAP concerning the operation of those devices, such as status and metering data. In step 544, the power control module passes the data to the programmable logic controller. In step 546, the power control module receives instructions such as power control commands from the programmable logic controller. In step 548, the power control module executes power control commands to effect control of the electrical devices based on those instructions. In an implementation of the technology, communication with the power control module by the programmable logic controller and the devices may be governed by the IEC 61850 communications protocol.

Figure 5D:
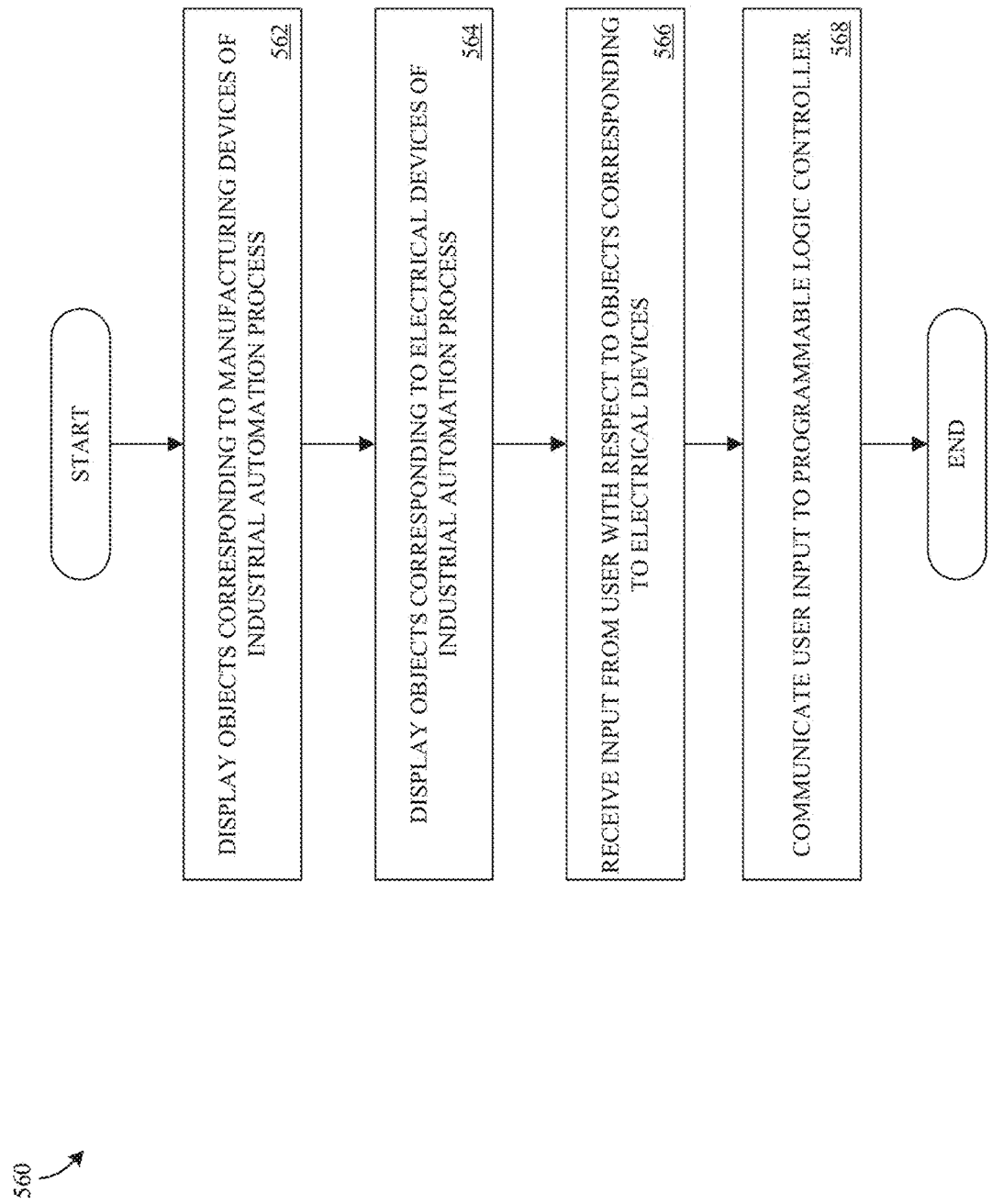
FIG. 5D illustrates a workflow of a human-machine interface of an IAP in an implementation.

FIG. 5D is an exemplary workflow of an HMI device during IAP operation, where the HMI device communicates with a programmable logic controller in an implementation. In step 562, the HMI displays objects corresponding to the manufacturing devices of the IAP. In step 564, the HMI displays objects corresponding to the electrical devices of the IAP. It may be appreciated by those with skilled in the field that step 564 can occur before step 562. The objects may be displayed as graphical objects on a user interface such as on a touchscreen display of a tablet computing device. In step 566, the HMI receives input with respect to the objects corresponding to the electrical devices of the IAP from a user, such as control engineer or plant manager, and in step 568, the HMI transmits that input to the programmable logic controller.

Figure 6A:
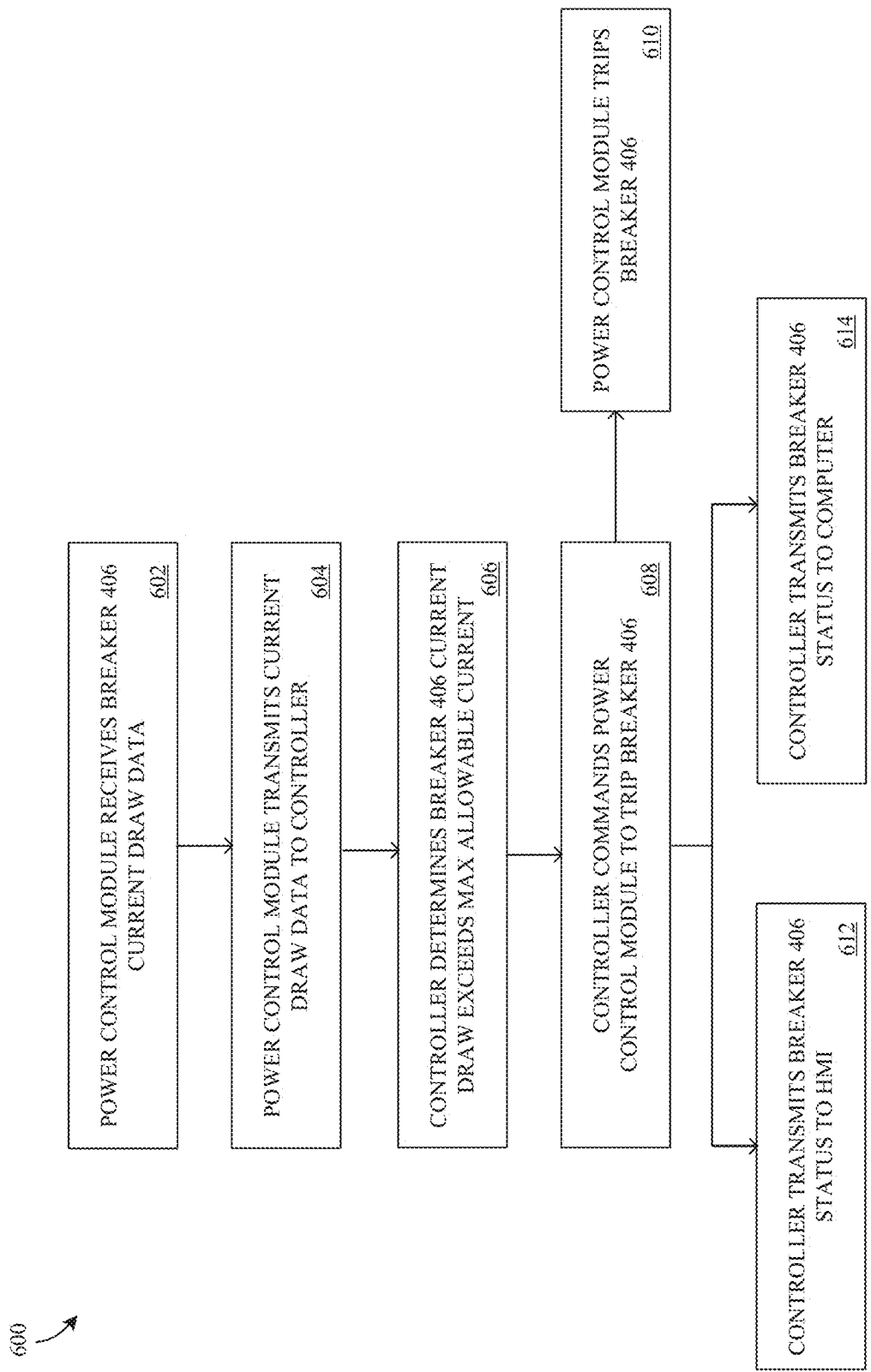
FIG. 6A illustrates a workflow for a load-shedding operation of an IAP in an implementation.

FIG. 6A is an exemplary workflow of an IAP during normal operation, when a breaker fault occurs, for example, an electrical short. In step 602, the power control module receives sensor data from a current sensor of a breaker such as breaker 406 shown in FIGS. 4A-4D. In step 604, the power control module transmits the current data to a controller to which it is operatively coupled. In an implementation of the technology, the controller may be a programmable logic controller. In step 606, the controller, running a power control program, determines that breaker 406 is drawing more current than its programmed maximum allowable current. In step 608, the PLC commands the power control module to trip open breaker 406. In step 610, the power control module trips open breaker 406. In steps 612 and 614 respectively, the controller transmits status information concerning breaker 406 to an HMI and to a computer with which the PLC is communicating. In an implementation of the technology, the sequence of steps happens in about 4 milliseconds, preventing a potentially catastrophic electrical failure that could lead to damage to the equipment coupled to breaker 406 and to a shutdown of the IAP.

Figure 6B:
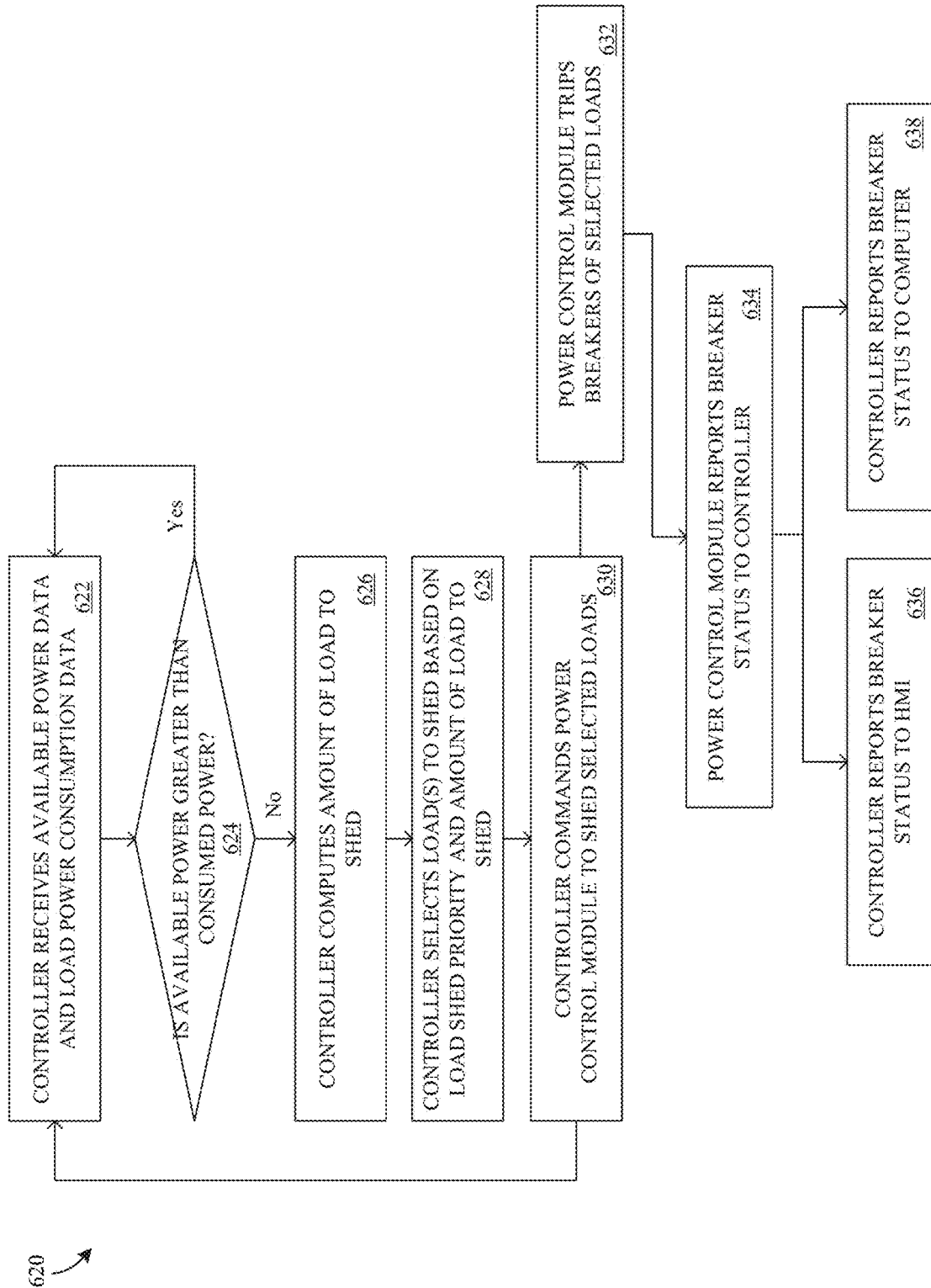
FIG. 6B illustrates a workflow for a load-shedding operation involving multiple breakers of an IAP in an implementation.

FIG. 6B is an exemplary workflow of an IAP during normal operation, when a precipitous drop in available power occurs, which triggers a load-shedding operation controlled by a load-shedding algorithm of the power control system. This drop in available power may be due to such problems as a grid power brown-out or an on-site generator running out of diesel fuel. In step 622, a controller coupled to the IAP receives IAP load power consumption data and available power data. In step 624, the controller determines whether the available power is greater than the load power consumption. If the available power is greater, the controller repeats step 622 as part of regularly monitoring the electrical system of the IAP. If, however, the available power is less than the load consumption, in step 626 the controller computes the overage (that is, the amount of power consumption exceeding the available power). In an implementation, the calculation may include a factor that provides some margin so that the load power consumption is not just below the available power, but sufficiently below it. For example, the load-shedding algorithm may include a factor of 25%, meaning that the amount of load to shed must be at least 125% of the overage. In step 628, the controller consults the load-shed prioritization of the power control program and selects the one or more loads that must be shed to reduce IAP power consumption. This prioritization may have been determined at the time the program was designed, or it may have been assigned as the control program was operating. The controller begins with a load whose shed priority is "1," and accumulates loads until the accumulation is greater than the amount of load to shed. In step 630, the controller commands the power control module to trip open the breakers of the selected loads. In step 632, the power control module trips open the breakers of the selected loads. In step 634, the power control module transmits breaker status data to the controller. In steps 636 and 638, the controller transmits breaker status data to connected HMIs and computers. In some implementations of the technology, the controller also transmits its activities in steps 622-630 to the HMIs and computers as they occur.

Figure 7:
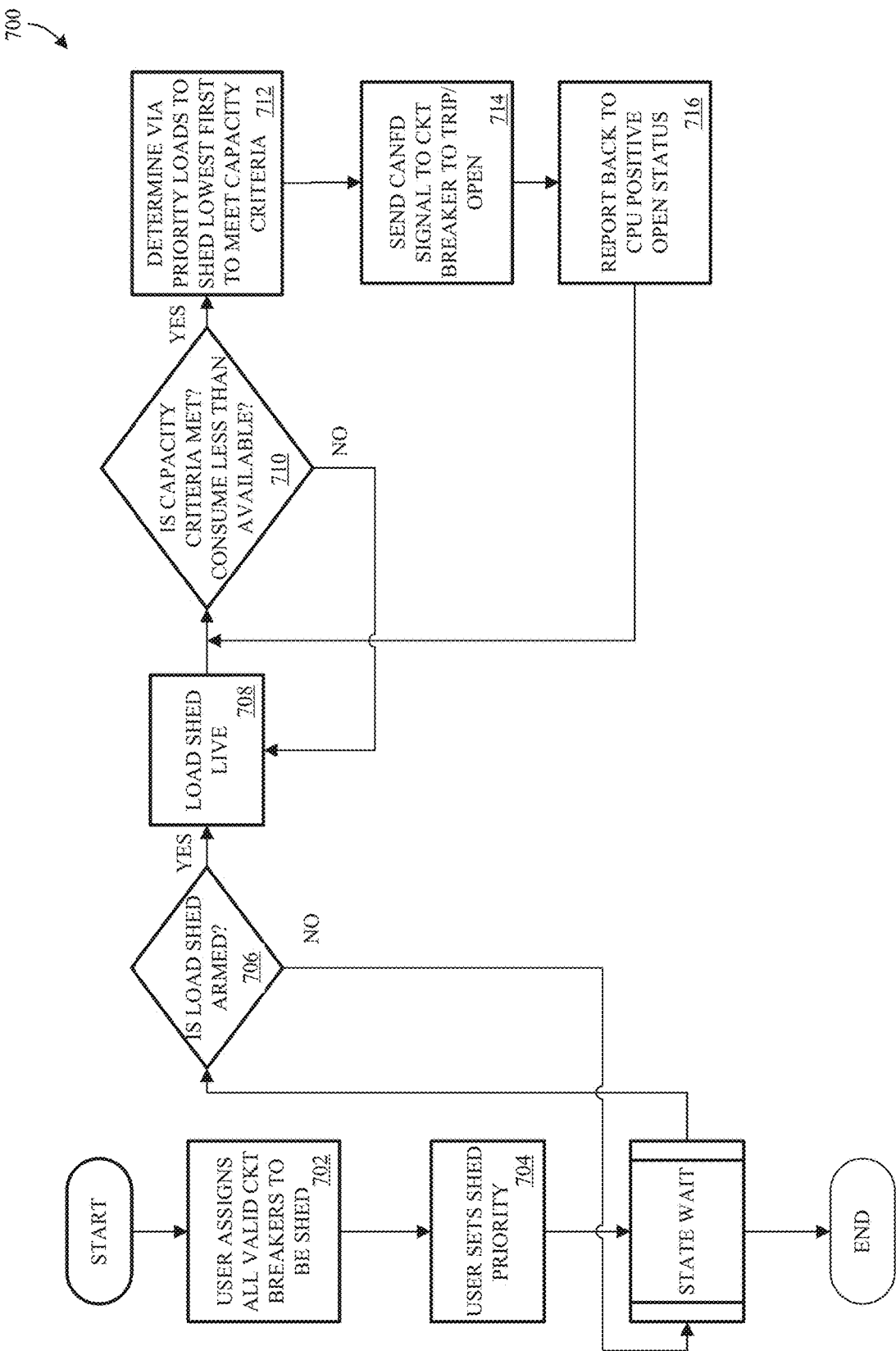
FIG. 7 illustrates a workflow for a load-shedding operation involving multiple electrical devices of an IAP in an implementation.

FIG. 7 demonstrates an exemplary workflow 700 of a load shedding operation as part of an integrated power control program. In step 702, a user determines which circuit breakers, such as breakers 406-409 on the electrical network of IAP 401 (as shown in FIGS. 4A-4D), are eligible for shedding. In step 704, the user assigns shed priorities to the "sheddable" loads of step 702. Steps 702 and 704 may be implemented in an implementation of view 432 of FIG. 4A or FIG. 10. As the control program runs, it determines whether the load shedding program is "armed," that is whether the load-shedding operation is ready to be activated in the event that load power consumption exceeds available power. In step 708, the load shed program is armed, and the controller checks for power over-consumption in step 710. If an overage occurs, the controller, using the load-shedding algorithm, determines the first load to shed in step 712. In step 714, a signal is sent to the breaker of the first load to trip open. After the signal is sent, in step 716, a report is transmitted back to the controller that the breaker is now open. The controller returns to step 710, where the controller rechecks load power consumption against available power, and repeats the load shedding, until the consumption falls below or sufficiently below the available power at which load shedding stops.

Figure 8:
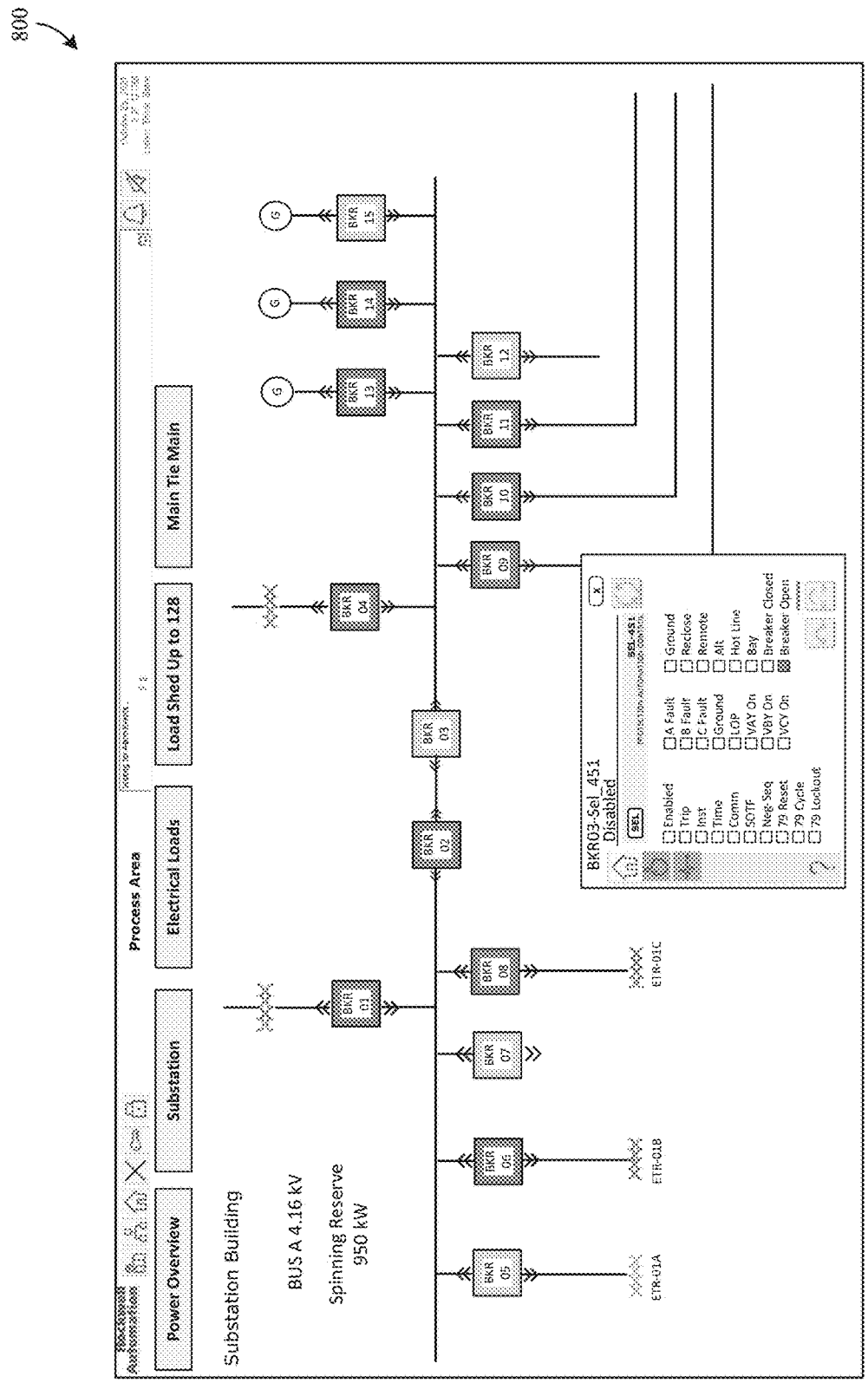
FIG. 8 illustrates a SCADA system architecture view of the user interface of an IAP in an implementation.

FIG. 8 is an exemplary designer view 800 of the integrated power control of a control system created after the system automatically discovers all the breakers that are connected to the IAP. In an implementation of the technology, the control system requests and receives the information from controller 422 of IAP 401, which in turn receives the information from power control module 420 as shown in FIGS. 4A-4D. In an implementation of the control system, a representation of the electrical network is created which includes all breakers and other electrical devices such as transformers and generators from the information received from power control module 420 and stored on controller 422. In view 800, a control system designer can select a breaker, represented by a square graphical object in the implementation shown, which displays breaker information such as an identifier and associated load power consumption, and whose color is immediately communicative of the breaker status (green if open, red if closed). In an implementation, the control system may be programmed to label each breaker in the electrical network with a unique default identifier at the time the breakers are auto discovered; these identifiers may be replaced with more convenient identifiers by the designer. These identifiers are known in programming parlance as GUIDs (graphical user identifiers). Upon clicking on a square, the system presents the designer with multiple window views containing properties or attributes of the breaker by which the designer can change aspects of breaker operation, for example, disabling a breaker for maintenance, or closing a breaker to bring the associated device online in the IAP.

Figure 9:
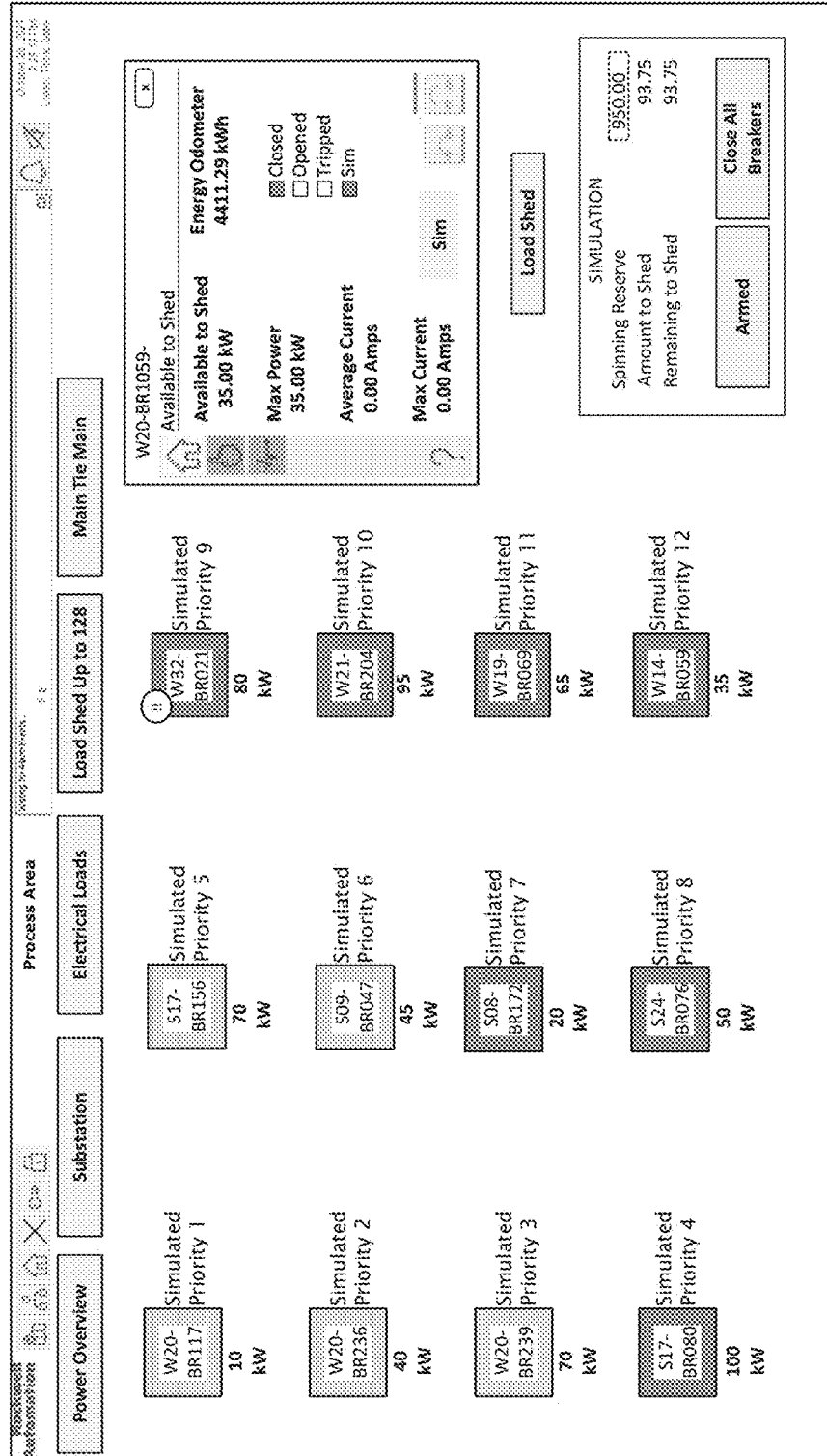
FIG. 9 illustrates a user interface design view of an integrated power control system of an IAP in an implementation.

FIG. 9 is an exemplary designer view 900 of the power control aspect of a control system created after the system automatically discovers all the breakers that are connected to the electrical network of an IAP such as IAP 401 as shown in FIGS. 4A-4D. In this implementation, eighteen breakers are connected to the electrical network of the IAP. Each breaker is represented by a square graphical object in an implementation of a view of the control system and are displayed in a row-by-column arrangement in order of shed priority. As in view 800, various properties of the breakers are displayed, and clicking a square brings up multiple window views containing more detailed information about the breaker or its associated load. These views also provide a designer with the ability to control aspects of breaker or load operation.

FIG. 10 is an exemplary implementation of designer view 1000 of a load-shed table populated by the control system which has automatically discovered and now displays breaker information from a connected programmable logic controller. In this view, the IAP comprises eighteen loads each with a corresponding circuit breaker. The breaker information is organized according to load-shed priority, starting with shed priority "1" for the first load to be shed in the event of, for example, an overage triggering a load-shedding operation. The list in view 1000 provides the designer with breaker identification and status as well as the ability to make breakers available or unavailable for shedding. In an implementation of the technology, the shed status values "Shed" (meaning the load has been shed in a load-shedding operation); "Disabled" (meaning the breaker is open and the load is off-line); "Available" (meaning the load is available for shedding); and "Inhibited" (meaning the load is not available for shedding). Each list item can be selected by the designer which then opens a new window by which the designer can change, for example, the breaker's identifier or shed priority.

Figure 11:
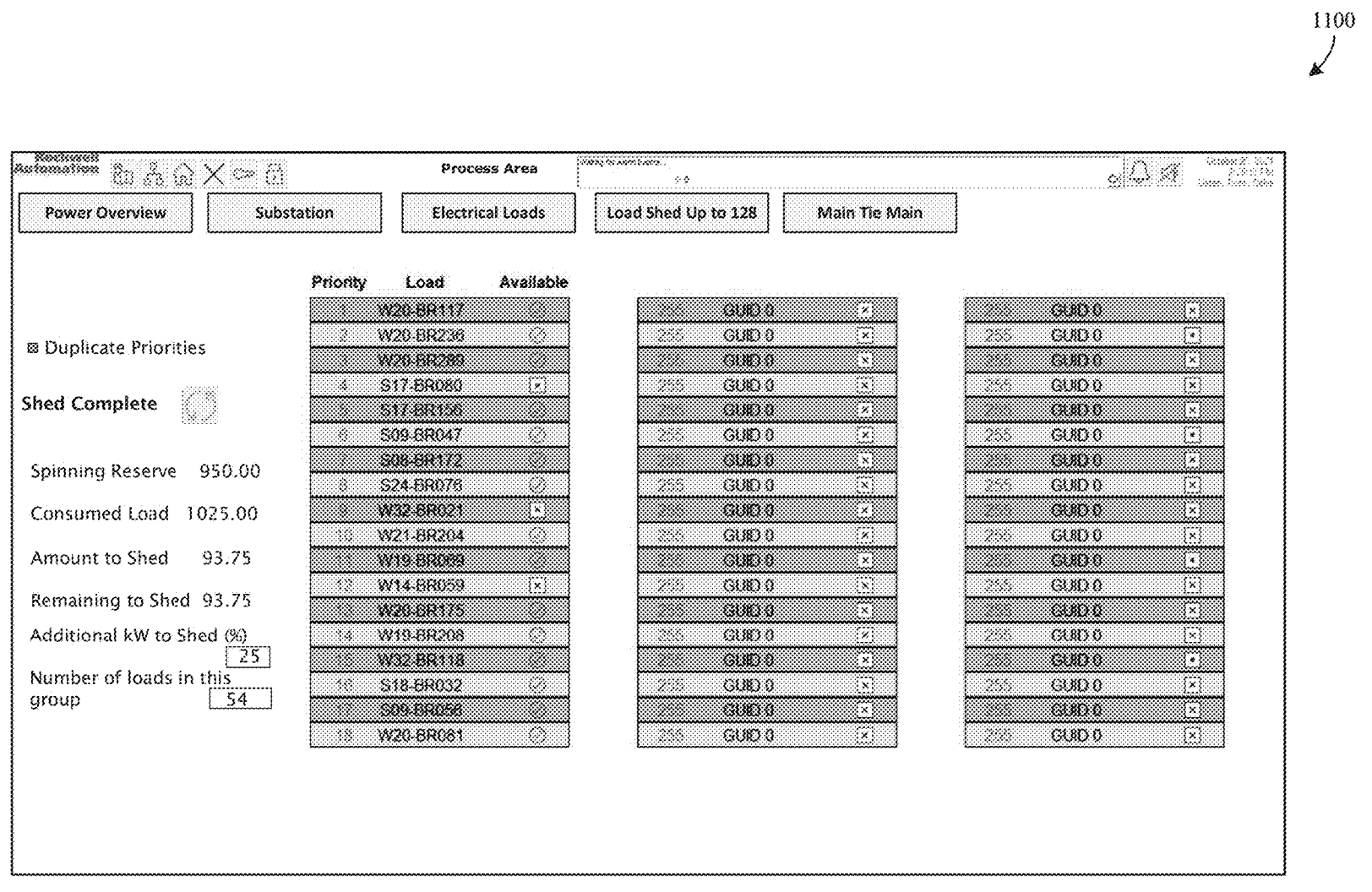

FIG. 11 is another exemplary designer view 1100 of a load-shed table for a much larger IAP of 54 loads, each with a corresponding breaker. The first eighteen breakers have shed priorities ranging from 1 to 18; the remaining loads are all set to a priority of 256, which if a shedding operation got that far, would mean the entire IAP was to go off-line.

Figure 12:
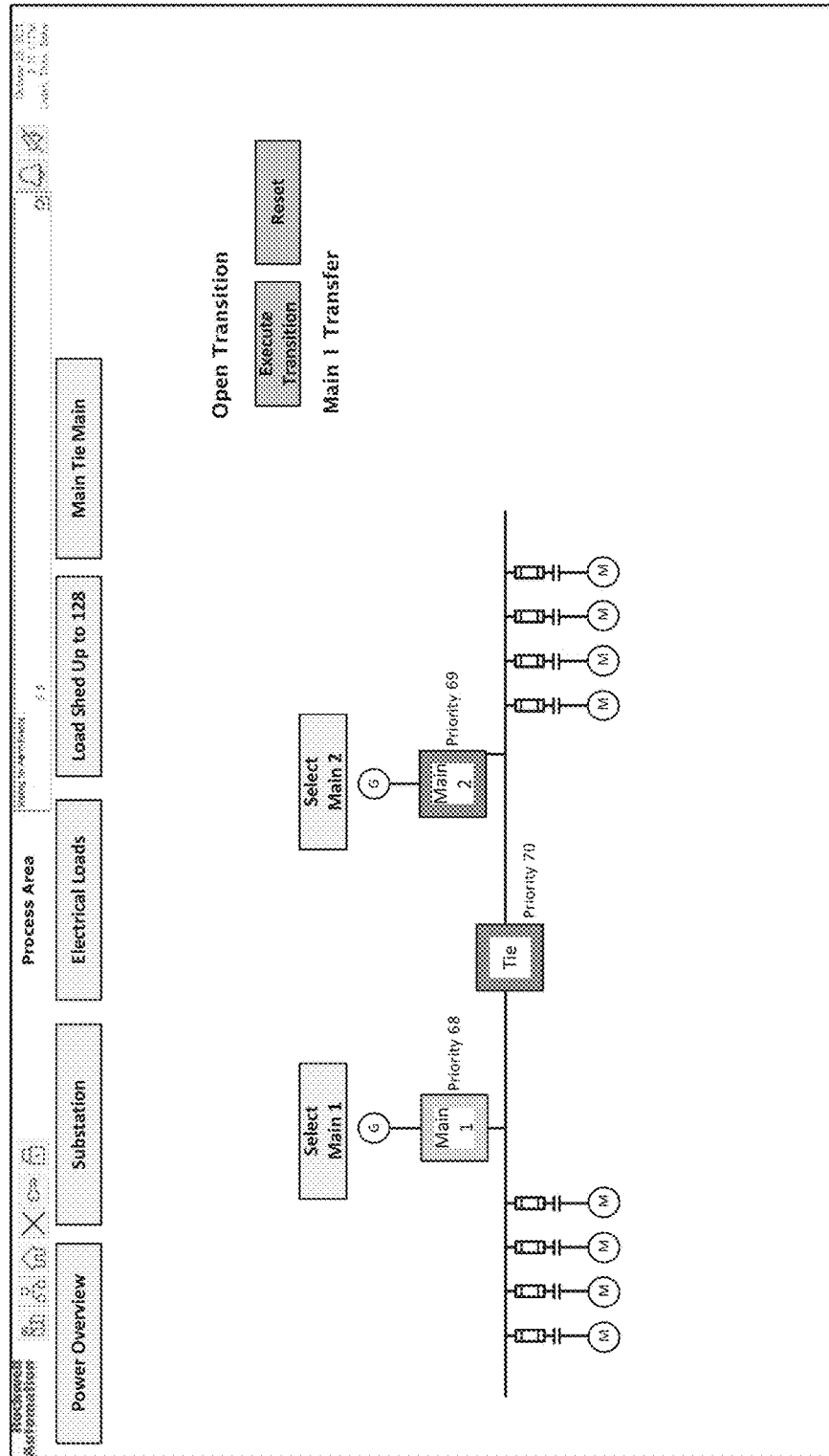
FIG. 12 illustrates a user interface view of a Main-Tie-Main control schema of an IAP design and control system in an implementation.

FIG. 12 is an exemplary view 1200 of main-tie-main control algorithm which is part of the power control program. In this view, two main breakers, each associated with a power source, are connected to a tie breaker, and each main breaker powers a subset of loads of the IAP. In this view, a designer can configure an open transition main-tie-main algorithm or a closed transition main-tie-main algorithm to be implemented in the event that one of the power sources becomes available, providing redundancy for the system.

Figure 13A:
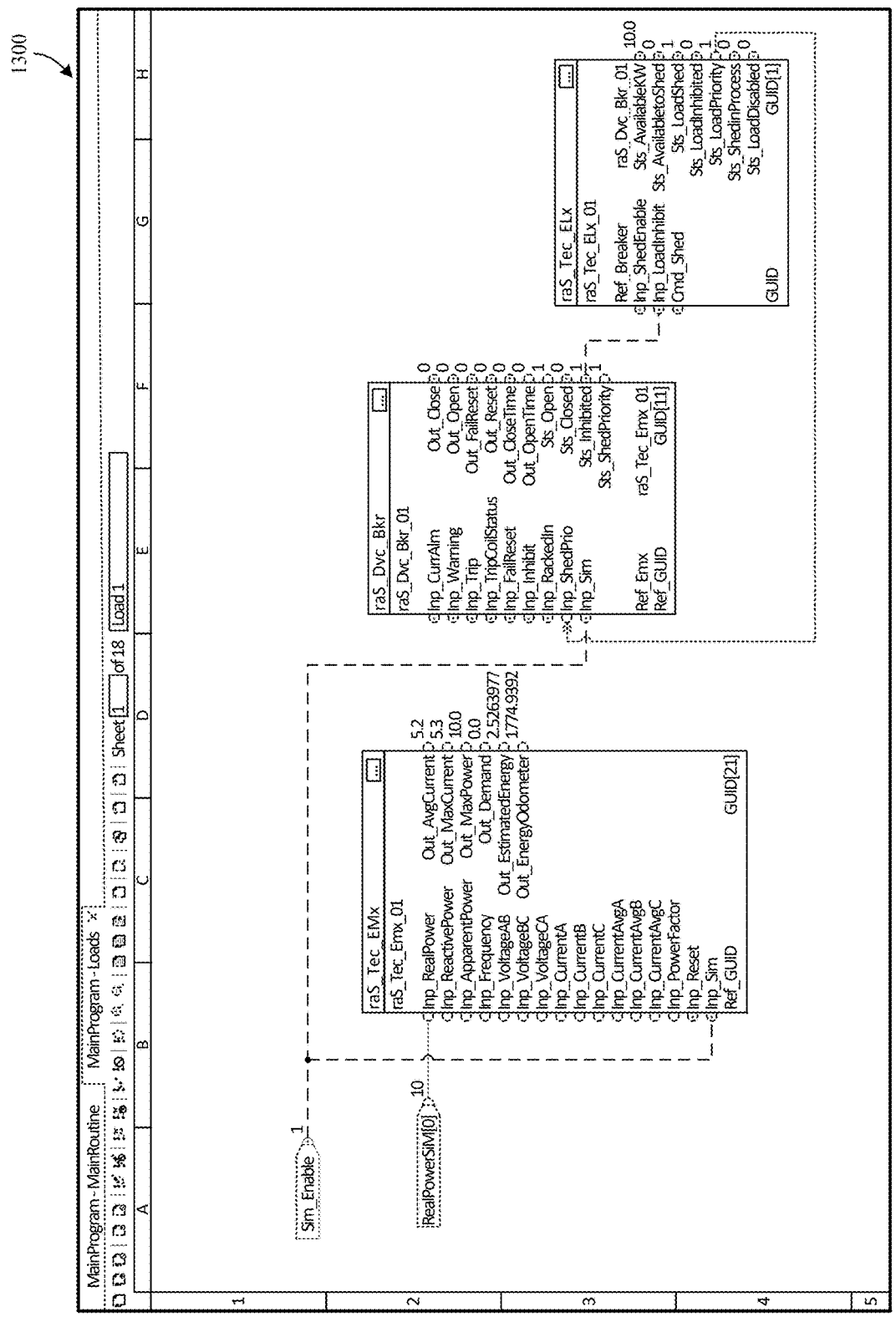
FIG. 13A illustrates a user interface view of a control system programming environment in an implementation.

FIG. 13A illustrates an exemplary designer view 1300 of a programming environment in the form of a functional block diagram as the integrated power and process control system of an IAP is designed. In view 1300, each load and associated breaker along with the properties and attributes of the devices are presented in block form; each block presents the various properties, attributes, and inputs and outputs of the loads and the breakers. Control of the devices is enabled by making connections between the blocks. In exemplary view 1300, the function blocks correspond to an electrical metering device providing power consumption data of the associated load, a breaker device providing breaker status information, and a load-shed prioritization block for the breaker during a load-shed operation.

Figure 13B:
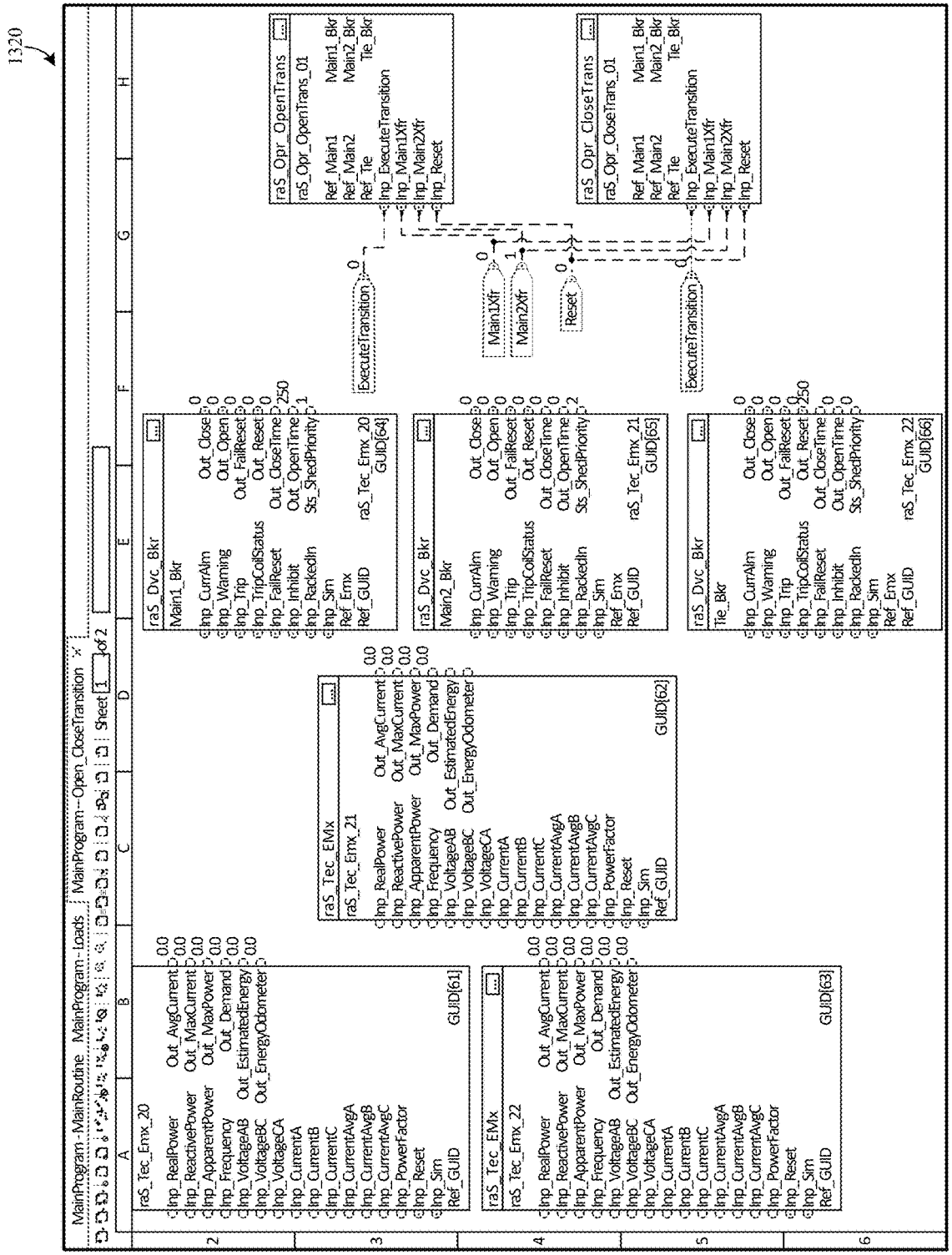
FIG. 13B illustrates a user interface view of transition control schemas for Main-Tie-Main breaker configurations in a control system programming environment in an implementation.

FIG. 13B is another exemplary designer view 1320 of a programming environment in the form of a functional block diagram during the design phase of designing the power and process control software of an IAP. In view 1320, open and closed transition programs for a main-tie-main arrangement of breakers is programmed for the power control aspect of the IAP control software.

Figure 14:
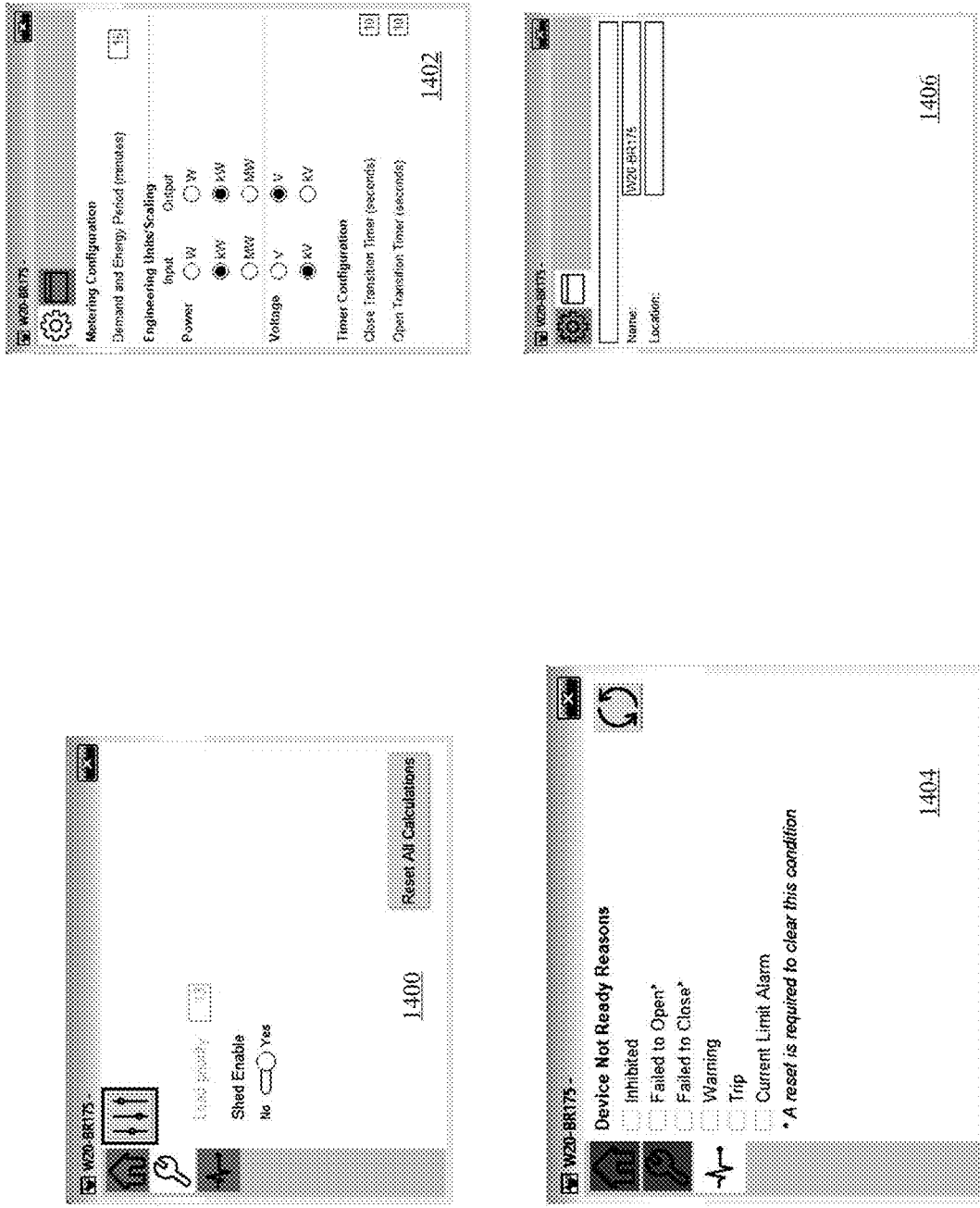
FIG. 14 illustrates user interface views of windows of device properties in a control system of an IAP in an implementation.

FIG. 14 illustrates multiple windows 1400-1406 available to a controller during IAP operation by which the plant engineer can control a breaker on the electrical network of the IAP. In window 1400, the engineer can enable or disable shedding of the load associated with the breaker. In window 1402, the engineer can configure the units used in the displayed information about the breaker. In window 1404, the engineer can see and change the breaker shed status. In window 1406, the engineer can assign a new identifier or GUID to the breaker and add information about the location of the load, for example, in the plant.

Figure 15:
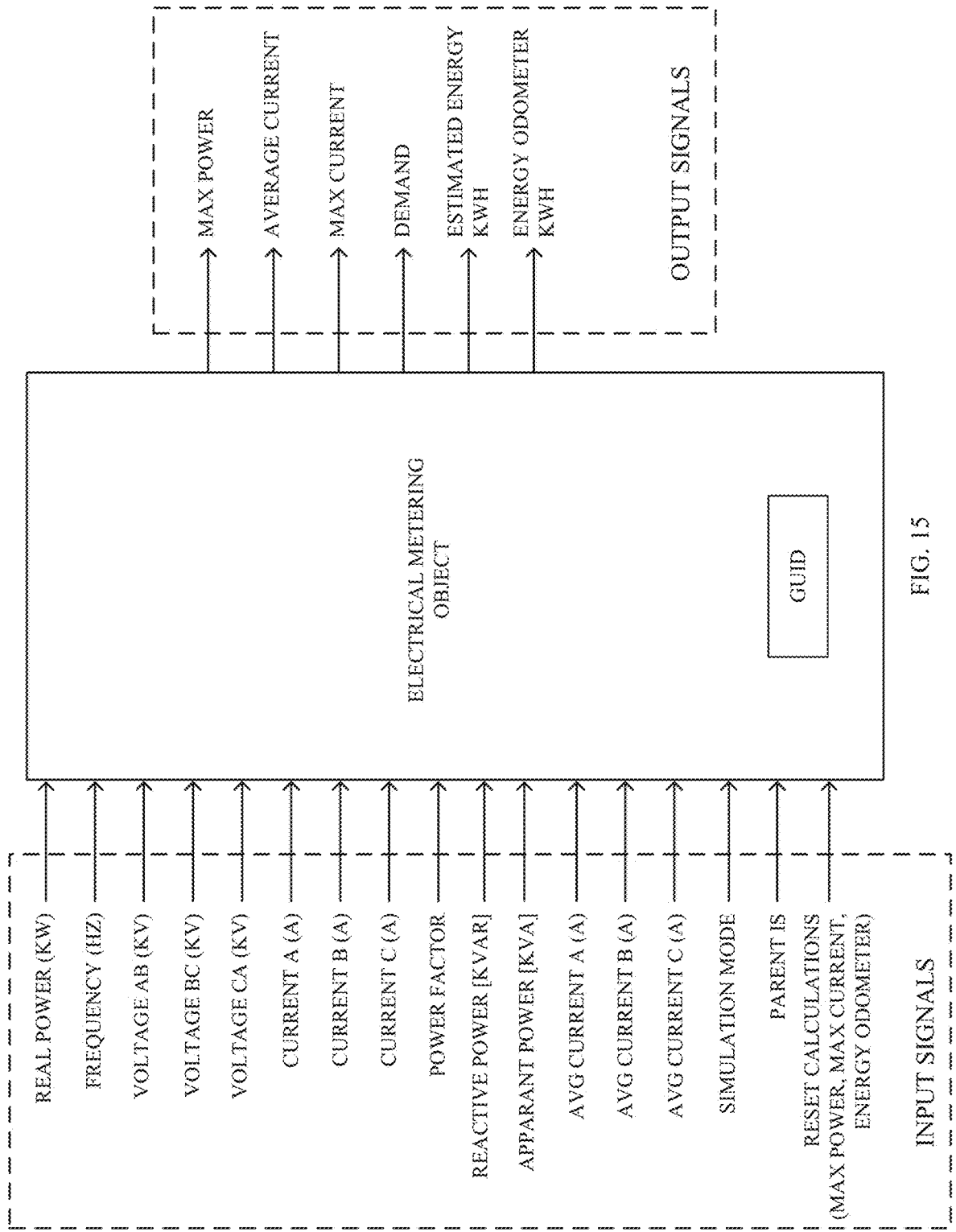
FIG. 15 illustrates a representation of an electrical metering programming object of a design and control system for an IAP in an implementation.

FIG. 15 is an exemplary representation 1500 of a functional block representing an electrical metering device in a functional block diagram type of control system programming environment. The electrical metering device may be operatively coupled to a breaker on an IAP electrical network. It may be appreciated that the electrical metering device may be an integral part of the breaker or of the associated load, or it may be a stand-alone device which interconnects with the breaker and/or the associated load. The diagram illustrates the various inputs the block receives from the actual device and the various outputs available to a system designer when configuring a power control strategy.

Figure 16:
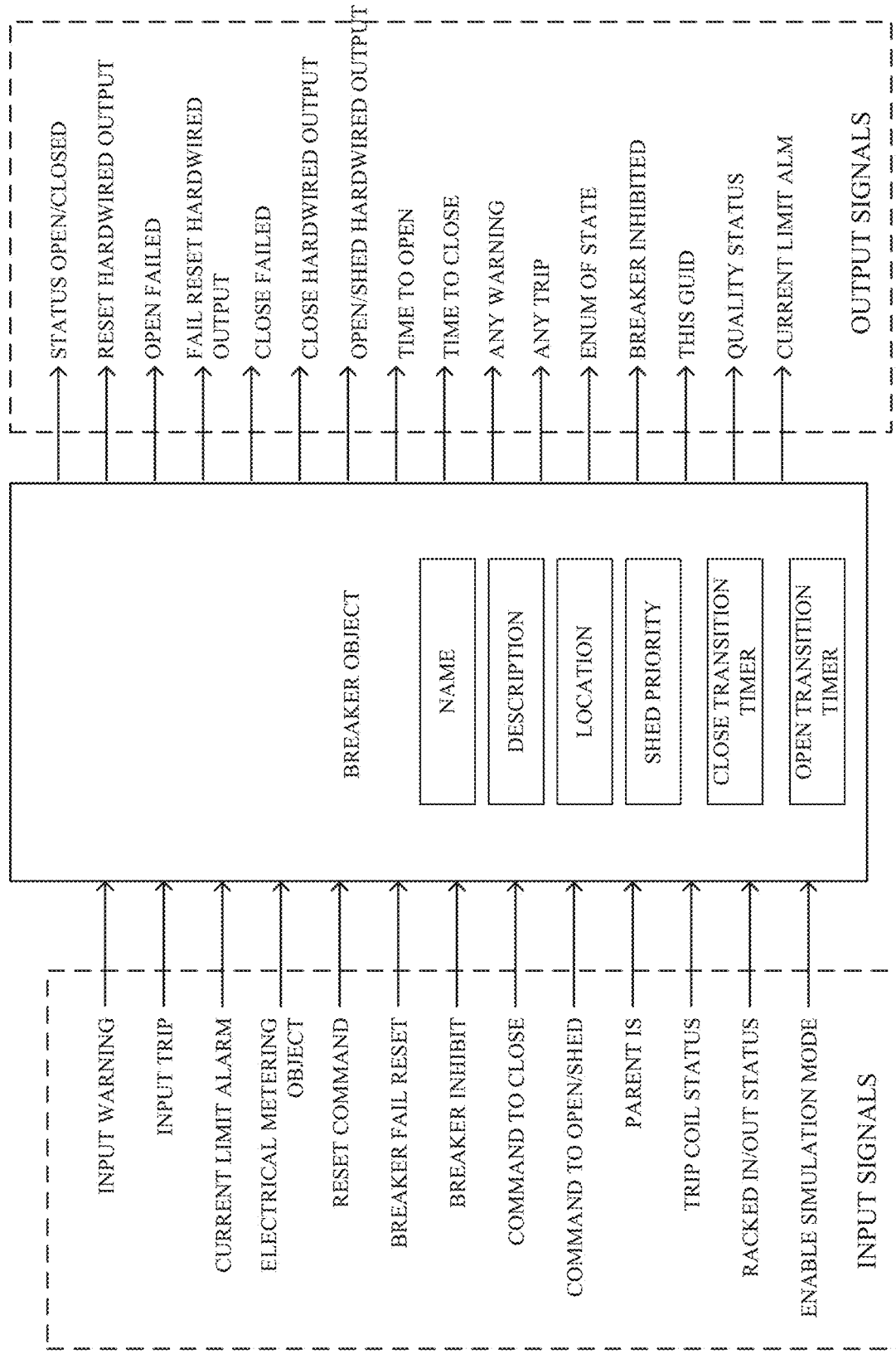
FIG. 16 illustrates a representation of a circuit breaker programming object of a design and control system for an IAP in an implementation.

FIG. 16 is an exemplary representation 1600 of a functional block representing a circuit breaker in a functional block diagram type of control system programming environment. The diagram illustrates the various inputs the block receives from the actual breaker and the various outputs available to a system designer when configuring a power control strategy.

Figure 17:
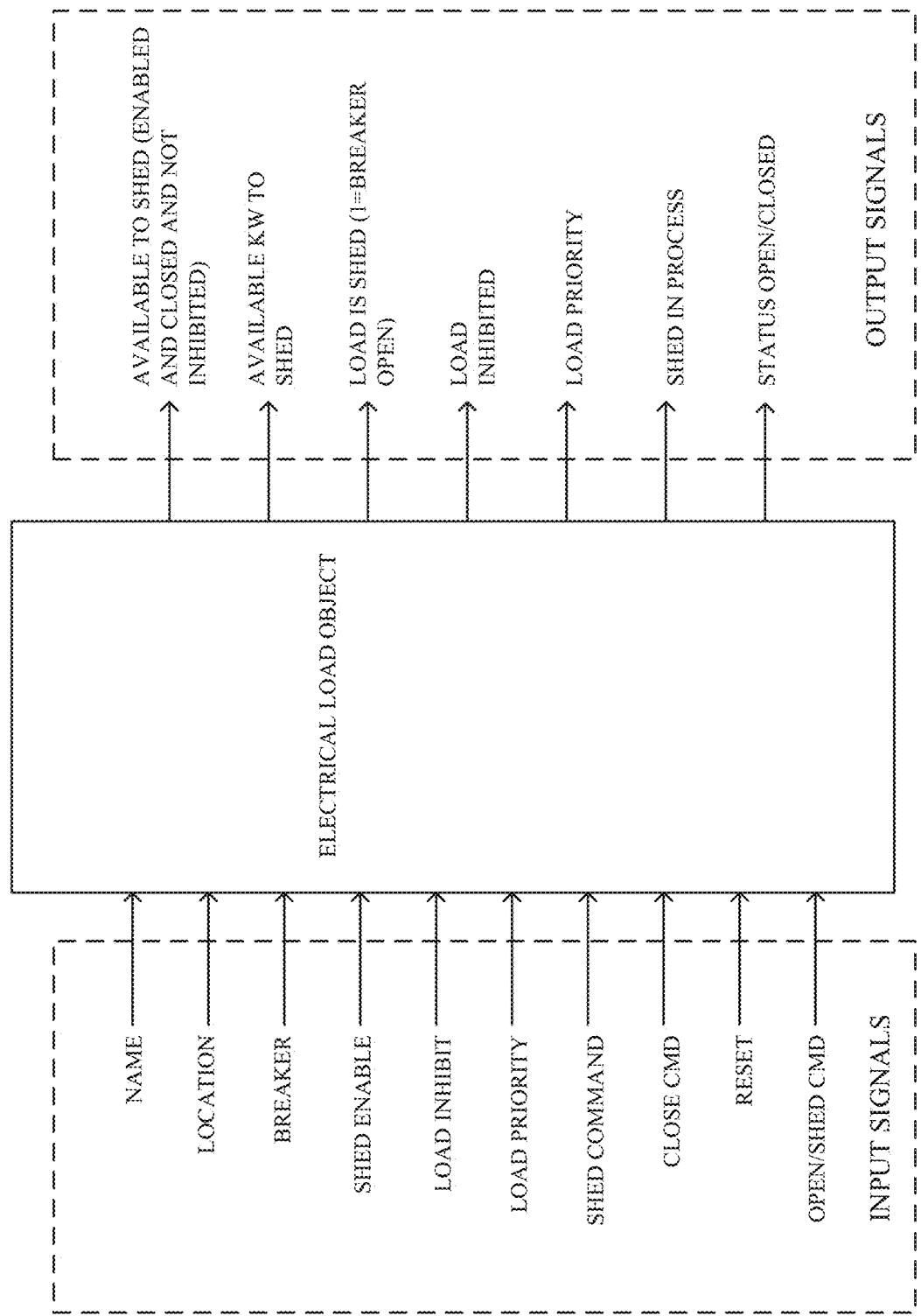
FIG. 17 illustrates a representation of an electrical load programming object of a design and control system for an IAP in an implementation.

FIG. 17 is an exemplary representation 1700 of a functional block representing an IAP load object in a functional block diagram type of control system programming environment. The diagram illustrates the various inputs the block receives from the breaker associated with the load and the various outputs available to a system designer when configuring a power control strategy.

Figure 18:
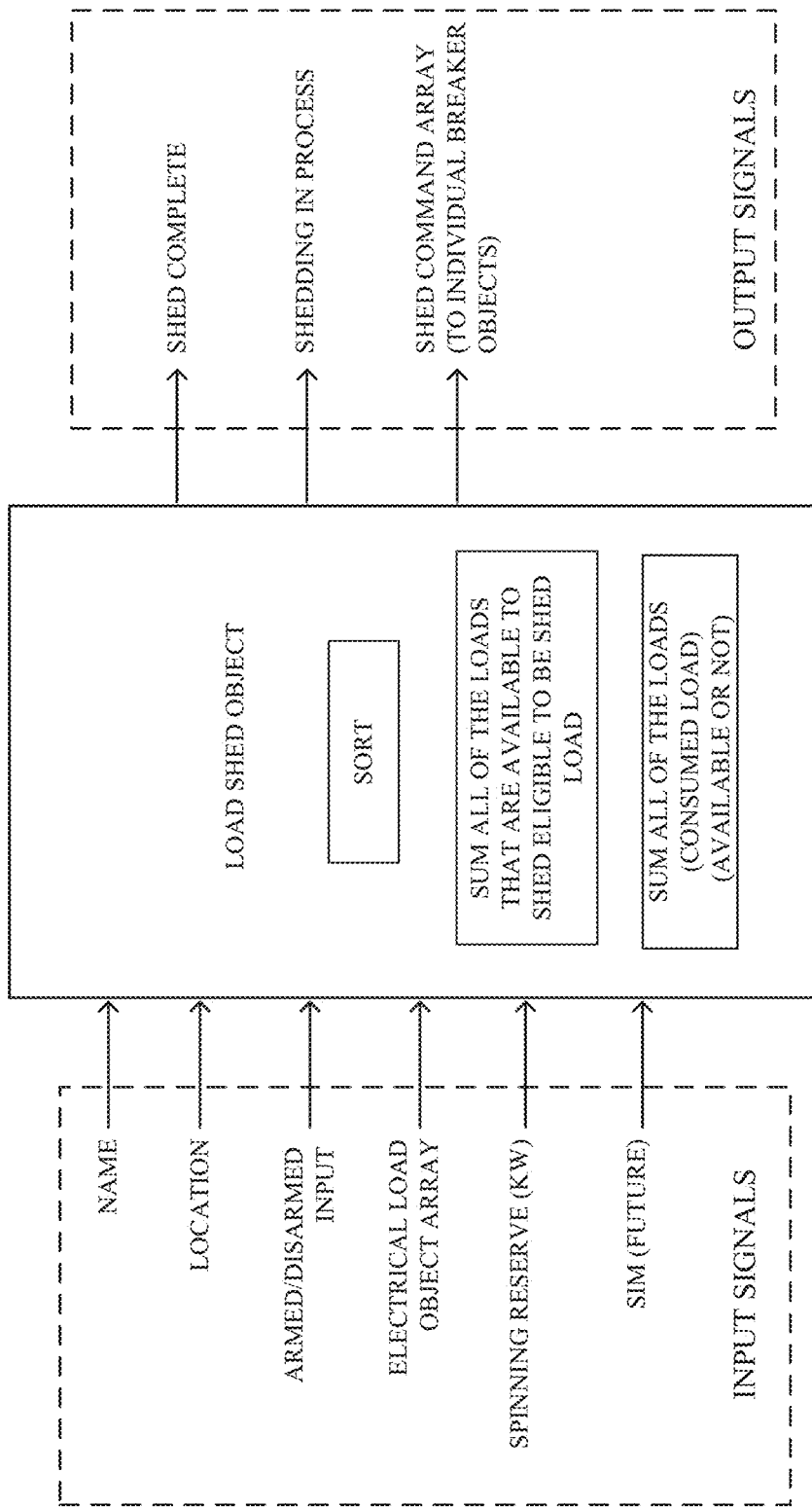
FIG. 18 illustrates a representation of a load-shed programming object of a design and control system for an IAP in an implementation.

FIG. 18 is an exemplary representation 1800 of a functional block representing a load shed operation in a functional block diagram type of control system programming environment. The diagram illustrates the various inputs the block receives from IAP electrical network and from the one or more power sources of the IAP and the various outputs available to a system designer when configuring a power control load-shedding strategy.

Figure 19:
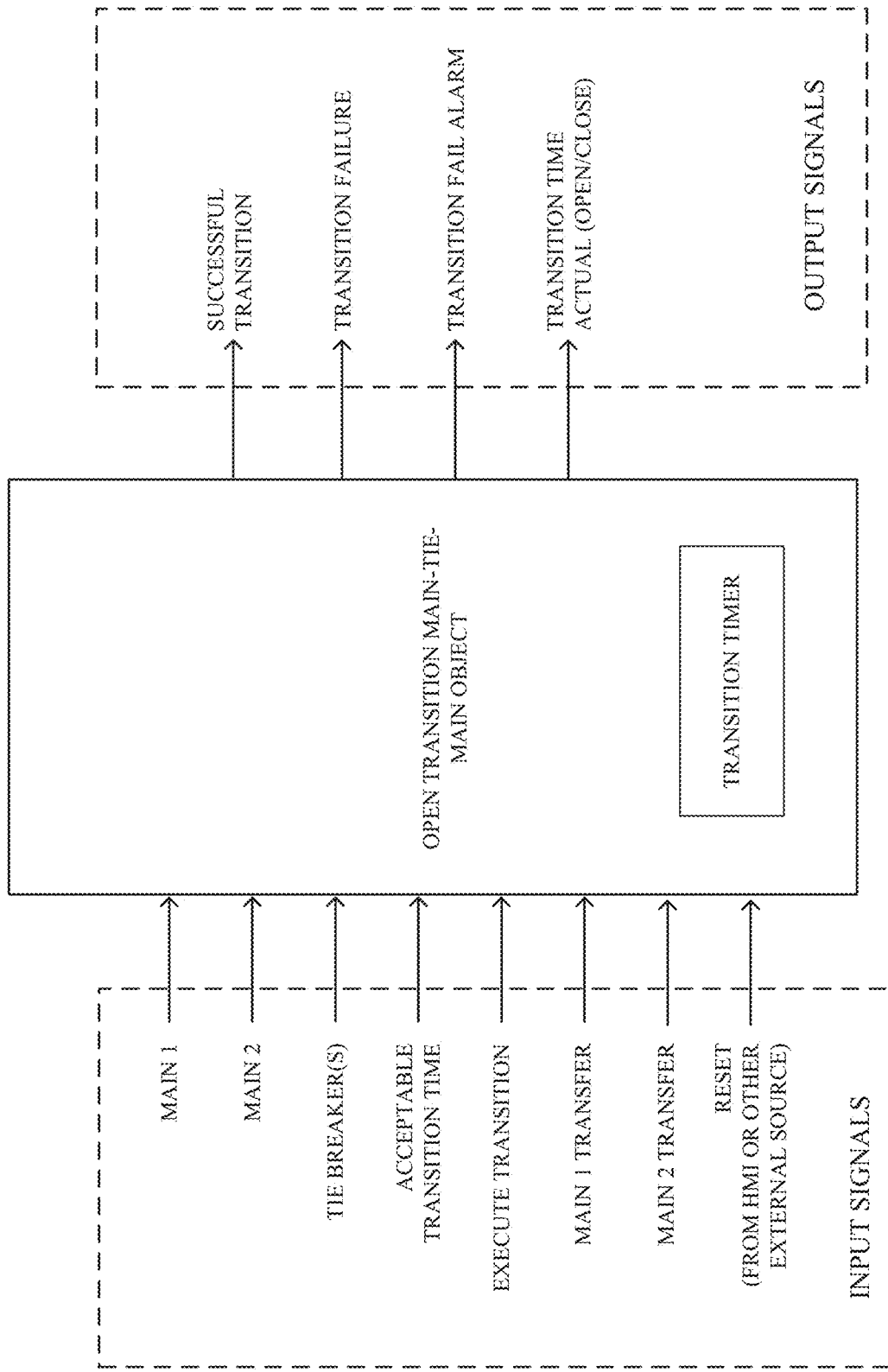
FIG. 19 illustrates a representation of an open transition Main-Tie-Main control schema of a design and control system for an IAP in an implementation.

FIG. 19 is an exemplary representation 1900 of a functional block representing an open transition main-tie-main operation in a functional block diagram type of control system programming environment. The diagram illustrates the various inputs the block receives from other blocks representing main and tie breakers in the IAP electrical network and the various outputs available to a system designer when configuring a power control open transition strategy.

Figure 20:
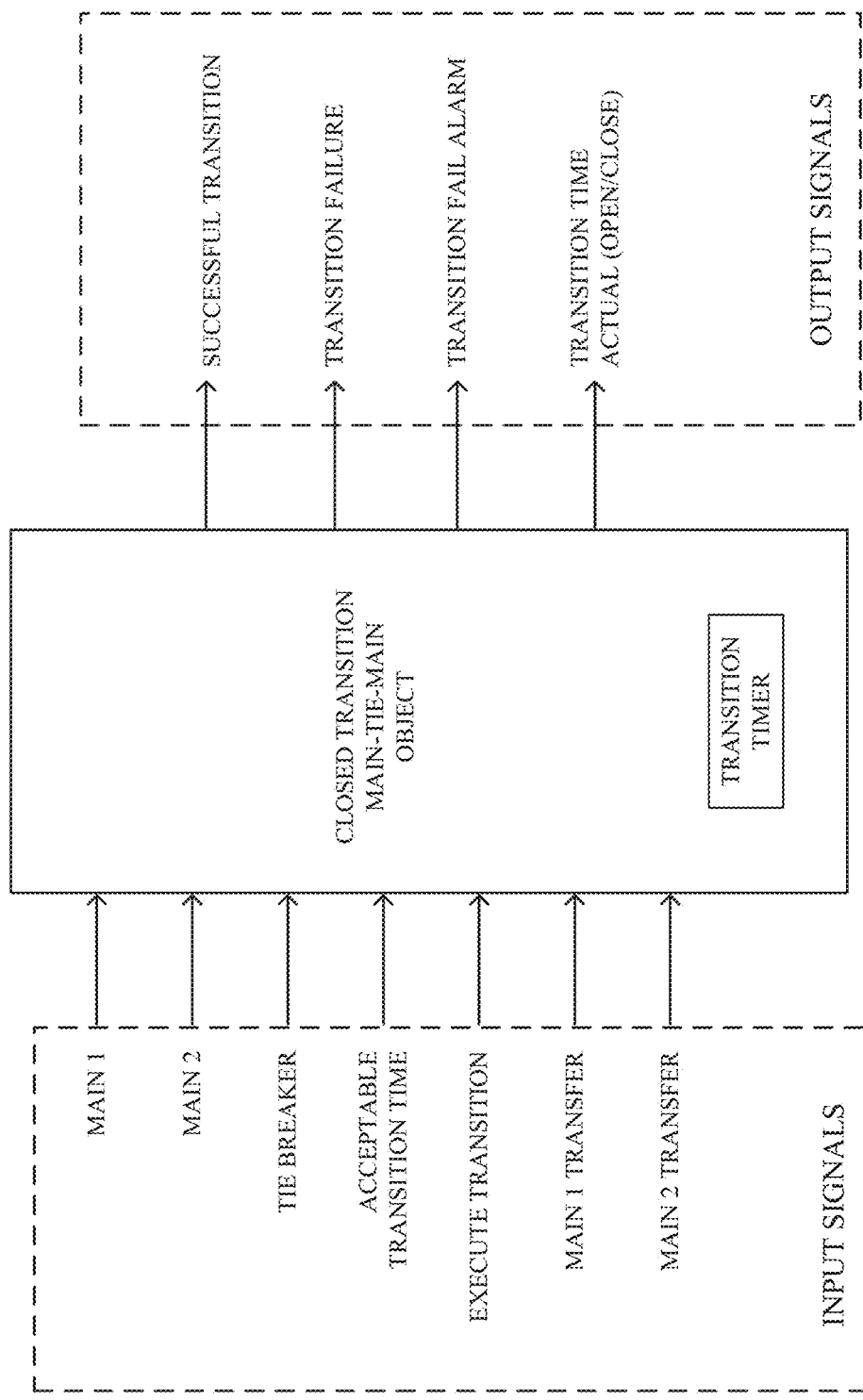
FIG. 20 illustrates a representation of a closed transition Main-Tie-Main control schema of a design and control system for an IAP in an implementation.

FIG. 20 is an exemplary representation 2000 of a functional block representing a closed transition main-tie-main operation in a functional block diagram type of control system programming environment. The diagram illustrates the various inputs the block receives from other blocks representing main and tie breakers in the IAP electrical network and the various outputs available to a system designer when configuring a power control closed transition strategy.

Figure 21:
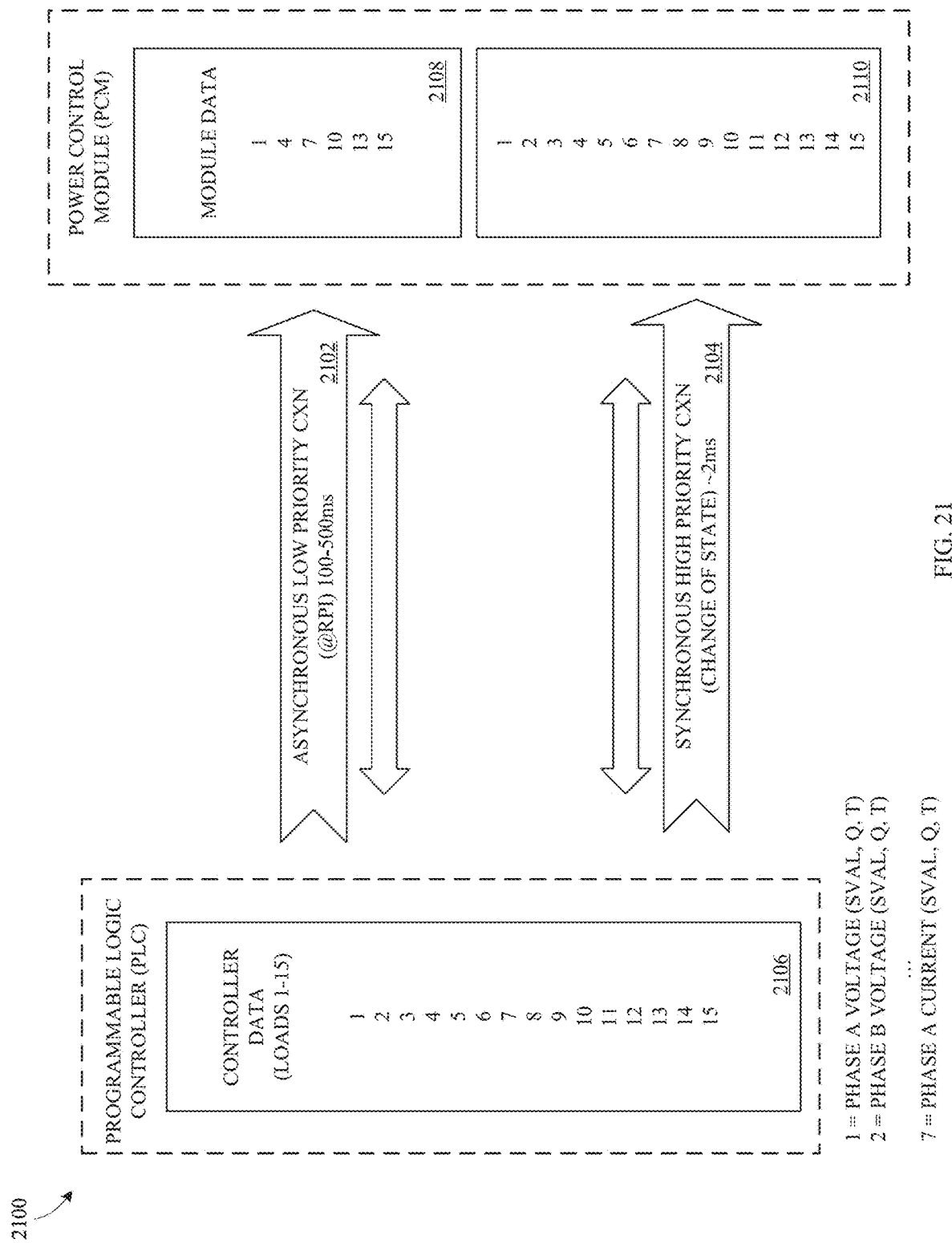
FIG. 21 illustrates a channel configuration between a programmable logic controller and a power control device in an IAP control system in an implementation.

FIG. 21 is an exemplary architectural diagram 2100 of prioritizing connections between a controller and a power control module. In this exemplary configuration, one or more channels is configured to provide a high-speed synchronous CIP (Critical Infrastructure Protection) connection between the controller and the power control module by which the controller can issue the commands necessary for high-priority, mission-critical operations. The controller may transmit high-priority commands to the power control module on high-speed synchronous CIP connection 2102 if, for example, the controller receives and detects that a critical change of state of a breaker in the TAP, such as a ground fault. The controller can issue a command to the power control module to trip open the breaker. In an implementation of the technology, the high-speed connection enables a response time on the order of 2 milliseconds which is necessary to prevent potentially catastrophic electrical events.

In addition to the high-speed, high-priority CIP connection, the control system maintains low-speed asynchronous connections for non-critical "housekeeping" activities such as transmitting telemetry data or transmitting commands received by a user operating a HMI, for example, to take a piece of equipment off-line. In an implementation of the technology, these low-speed connections 2104 operate according to the rate packet interval (RPI), which may be programmed to operate every 100 to 500 milliseconds, which is too slow for a controller to respond to an emergency situation involving the power system.

Figure 22:
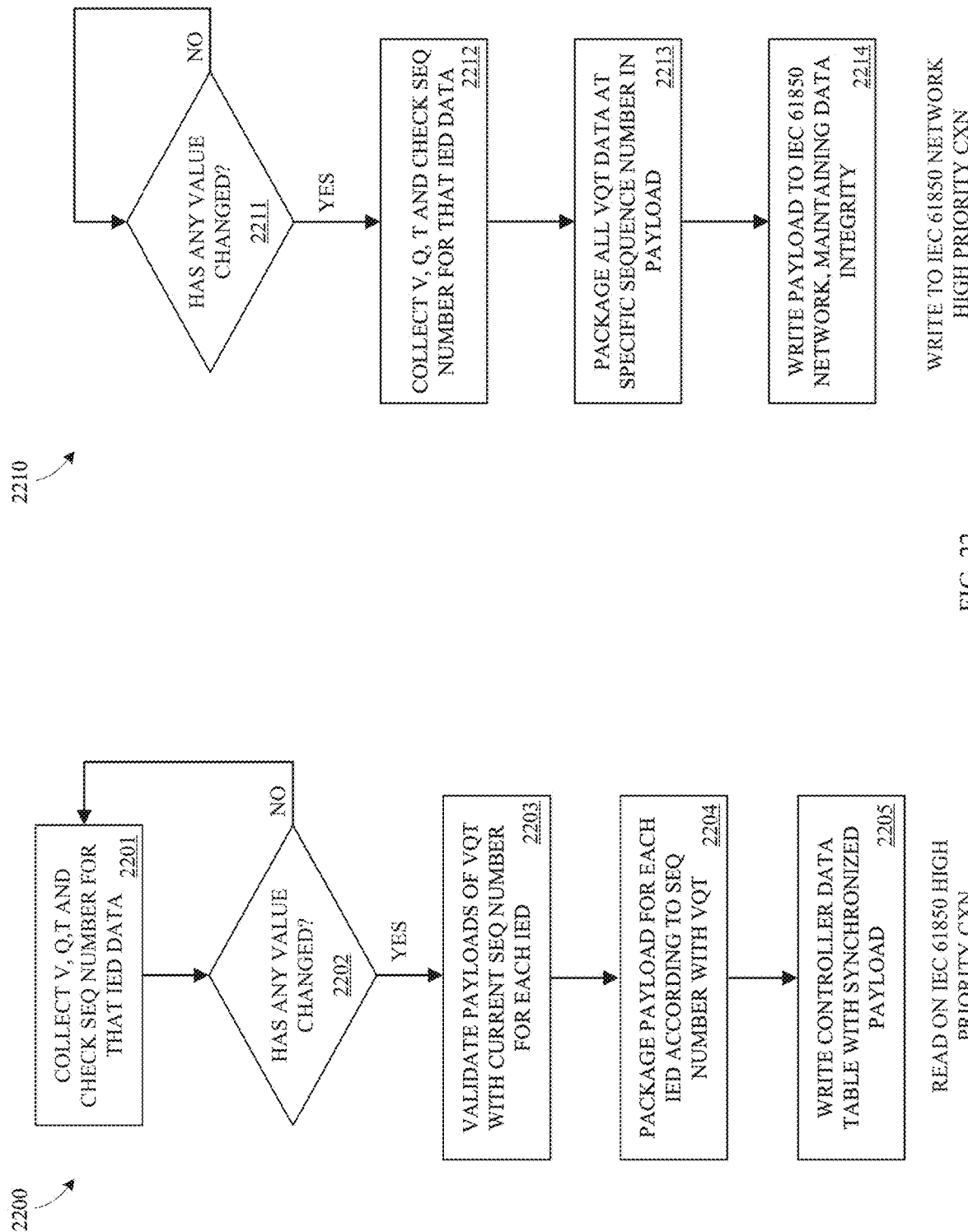
FIG. 22 illustrates a workflow for sequencing data packets transmitted across a high-speed CIP channel of an IAP control system in an implementation

FIG. 22 illustrates an exemplary workflows 2200 and 2210 of methods used by a power control module of an TAP to communicate with the PLC and the electrical network of the TAP in the event of a change of state of an electrical device on the network in an implementation. The data or message payload that is communicated between devices is in the form of packets which include value, quality, and timestamp attributes ("VQT"). In an exemplary configuration of the technology, in step 2201 of workflow 2200, the PCM receives data from multiple electrical devices where the arrival time of the data is out of order from the time the data was collected. In other words, due to latency in the communications between the devices and the PCM, packets of information sent to the PCM in the order of 1, 2, 3, 4 may arrive at the PCM in the order of 3, 1, 2, 4. Therefore, to ensure that the PLC provides the correct command in response to the data, the PCM must reference the timestamp or sequence number of the message packets. In step 2202, the PCM determines whether any IED values have changed. If a value has changed, in step 2203, the PCM validates the payloads of VQT data according to the sequence number for the IED. In step 2204, the PCM sequences the message packets according to the timestamp or sequence number of the packets, and in step 2205, transmits the sequenced information to the controller data table of the PLC. In workflow 2210, the PCM receives a VQT data packet from the PLC. At step 2211, the PCM checks whether VQT data received from the PLC has changed. When the PCM detects that a value has changed, at step 2212, the PCM collects the VQT data and checks the sequence number for the TED to which the packet is directed. In step 2213, the PCM packages the packets by sequence number for the relevant IED. Referencing and packaging the VQT data in this way ensures the integrity of the data transmitted between the IED and the PLC. At step 2213, the payload is transmitted on the 61850 network to the relevant IED. In an implementation, the power control logic assigns the transmission of high-priority communications to high-speed synchronous data channels between the power control module and the controller. High-priority communications include, for example, data indicating a change-of-state of an IED, an indication of anomalous behavior of an IED, or information relating to a load-shedding operation or to a main-tie-main transition operation.

Figure 23:
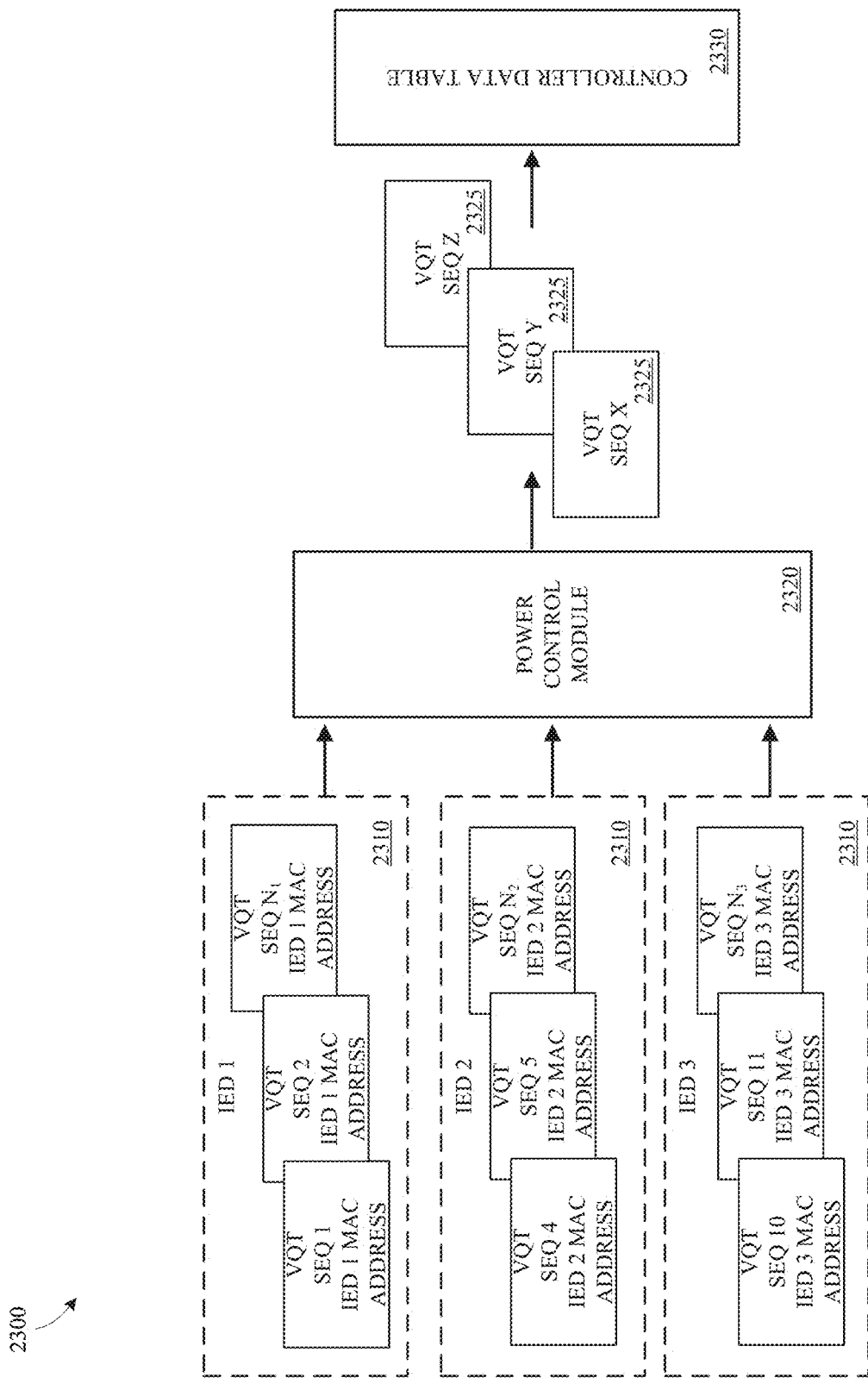
FIG. 23 illustrates an implementation of sequencing data packets transmitted across a high-speed CIP channel for an IAP control system in an implementation.

FIG. 23 is an exemplary diagram 2300 of the process of sequencing the packets of information received from multiple intelligent electrical devices (IEDs) by the controller in an implementation IEDs 2310 transmit to PCM 2320 payloads containing VQT data along with the network address of the transmitting IED and a sequence number indicating the order or time at which the VQT was acquired. The VQT payloads transmitted between PCM 2320 and controller 2330 are carried on high-speed synchronous data channels to maintain the integrity of the data, i.e. so the transmission correctly reflects what the power control logic of controller 2330 has determined from the incoming data from IEDs 2310. PCM 2320 orders the packets according to their sequence numbers and forwards ordered packets 2325 to controller data table 2330.

Figure 24:
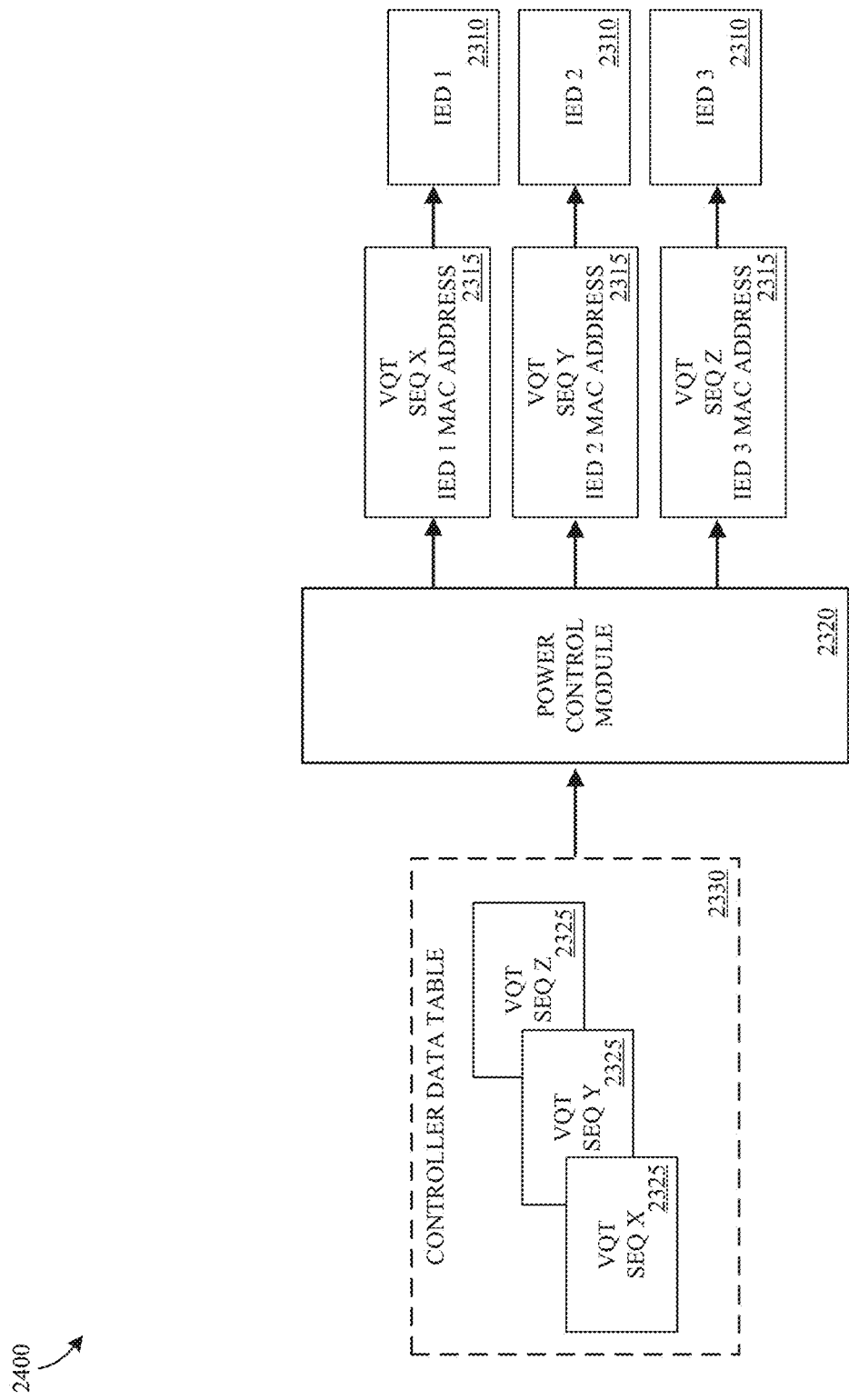
FIG. 24 illustrates an implementation of transmitting sequenced data packets across a high-speed CIP channel for an IAP control system in an implementation.

FIG. 24 is an exemplary diagram 2400 of the process of reading the sequenced data of IEDs 2310 in packets 2325 from controller data table 2330 by PCM 2320 which then transmits payloads 2315 containing VQT and ordered sequence numbers to IEDs 2310 using the IED network addresses of the payloads.

Figure 25:
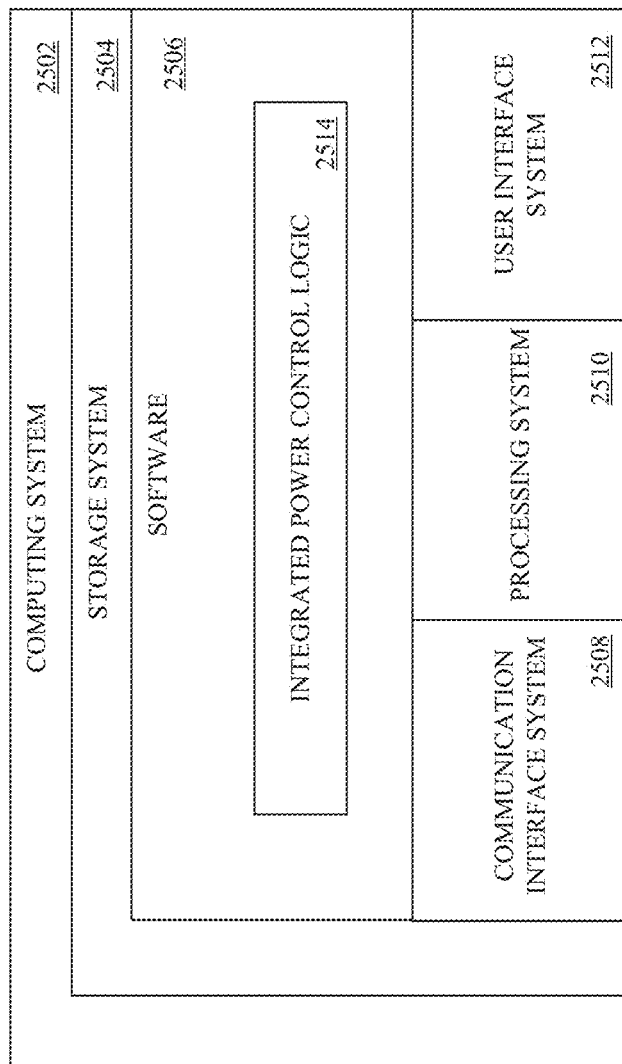
FIG. 25 illustrates a computing system for a design and control system of an IAP in an implementation.

FIG. 25 illustrates computing system 2502, which is representative of the computers and computing devices disclosed herein for providing an integrated design environment, as well as an integrated runtime environment. Examples include computing devices such as computer 316 and computer 424, as well as PLC 310, power control module 312, HMI 314, controller 422, power control module 420, and HMI 426. Computing system 2502 is representative of any system or collection of systems with which the various operational architectures, processes, scenarios, and sequences disclosed herein for integrated design, development, and deployment (and runtime) of power control in an industrial automation process may be employed. Computing system 2502 may be implemented as a single apparatus, system, or device or may be implemented in a distributed manner as multiple apparatuses, systems, or devices. Computing system 2502 includes, but is not limited to, processing system 2510, storage system 2504, software 2506, communication interface system 2508, and user interface system 2512 (optional). Processing system 2510 is operatively coupled with storage system 2504, communication interface system 2507, and user interface system 2512. Computing system 2502 may be representative of a cloud computing device, distributed computing device, or the like.

Processing system 2510 loads and executes software 2506 from storage system 2504. Software 2506 includes and implements industrial automation program 2514, which is representative of the application, programs, processes, methods, and environments discussed with respect to the preceding Figures. When executed by processing system 2510, software 2506 directs processing system 2510 to operate as described herein for at least the various processes, operational scenarios, and sequences discussed in the foregoing implementations. Computing system 2502 may optionally include additional devices, features, or functionality not discussed for purposes of brevity.

Referring still to FIG. 25, processing system 2510 may comprise a micro-processor and other circuitry that retrieves and executes software 2506 from storage system 2504. Processing system 2510 may be implemented within a single processing device but may also be distributed across multiple processing devices or sub-systems that cooperate in executing program instructions. Examples of processing system 2510 include general purpose central processing units, graphical processing units, application specific processors, and logic devices, as well as any other type of processing device, combinations, or variations thereof.

Storage system 2504 may comprise any computer readable storage media readable by processing system 2510 and capable of storing software 2506. Storage system 2504 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 2504 may also include computer readable communication media over which at least some of software 2506 may be communicated internally or externally. Storage system 2504 may be implemented as a single storage device but may also be implemented across multiple storage devices or sub-systems co-located or distributed relative to each other. Storage system 2504 may comprise additional elements, such as a controller, capable of communicating with processing system 2510 or possibly other systems.

Software 2506 (including integrated industrial automation program 2514) may be implemented in program instructions and among other functions may, when executed by processing system 2510, direct processing system 2510 to operate as described with respect to the various operational scenarios, sequences, and processes illustrated herein. For example, software 2506 may include program instructions for implementing integrated power control logic as described herein, and/or for providing an integrated design environment as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 2506 may include additional processes, programs, or components, such as operating system software, virtualization software, or other application software. Software 2506 may also comprise firmware or some other form of machine-readable processing instructions executable by processing system 2510.

In general, software 2506 may, when loaded into processing system 2510 and executed, transform a suitable apparatus, system, or device (of which computing system 2502 is representative) overall from a general-purpose computing system into a special-purpose computing system customized to provide integrated power control as described herein, and/or an integrated design environment. Indeed, encoding software 2506 on storage system 2504 may transform the physical structure of storage system 2504. The specific transformation of the physical structure may depend on various factors in different implementations of this description. Examples of such factors may include, but are not limited to, the technology used to implement the storage media of storage system 2504 and whether the computer-storage media are characterized as primary or secondary storage, as well as other factors.

For example, if the computer readable storage media are implemented as semiconductor-based memory, software 2506 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 2508 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 2502 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

In some implementations of the present technology, the computer or computing apparatus obtains a list of the intelligent electrical devices from the programmable logic controller.

In some implementations of the present technology, the computing apparatus creates a visual display of the list of intelligent electrical devices in the integrated design environment.

In some implementations of the present technology, the process control logic is represented by functional block diagrams corresponding to assets of the industrial automation process.

In some implementations of the present technology, the power control logic is represented by functional block diagrams corresponding to the intelligent electrical devices.

In some implementations of the present technology, the functional block diagrams representing the intelligent electrical devices of the power control logic are displayed visually, are programmable, and have variable settings or properties.

In some implementations of the present technology, the programmable logic controller obtains the list of intelligent electrical devices from a power control module and passes the list to the integrated design environment for use in programming.

In some implementations of the present technology, the power control module is represented by a functional block diagram.

In some implementations of the present technology, the functional block diagram of the power control module is visually displayed, is programmable, and has variable settings.

In some implementations of the present technology, the power control logic comprises a load-shed strategy wherein load-shedding priority information from the intelligent electrical devices is imported into the load-shed strategy.

It may be appreciated from the foregoing discussion that the disclosed technology provides the technical effect of allowing a control engineer to design power control logic which the controller may implement for power control along with the process control as the automated process is in operation. The disclosed automation technology also obviates the need for a control engineer to physically gather electrical device data and manually upload such data into a control program. Instead, the automation technology automatically discovers electrical devices on the electrical network and populates the design software with the devices as well as device attributes or properties which the control engineer can use for control programs.

The automation technology further provides the programmable controller with the ability to issue commands at high speed in response to catastrophic or imminently catastrophic electrical events. The automation technology may also allow plant or factory personnel to control not only the automated process but also the power to electrical devices in the process via HMI devices, such as wireless tablets, from locations remote from those devices. And, as a process control system can be visually displayed on various computing devices connected by an IT network to the programmable controller, so too can the power control system be displayed on those devices, enabling engineers and other users to conveniently monitor and control the devices on the electrical network.

While the technology has been described in terms of several implementations, there are alterations, modifications, permutations, and substitute equivalents which fall within the scope of the technology. Although subsection titles have been provided to aid in the description of the technology, these titles are merely illustrative and are not intended to limit the scope of the technology.

It should also be noted that there are numerous alternative ways of implementing the methods and apparatuses of the technology. It is therefore intended that the following appended claims be interpreted as including all such alterations, modifications, permutations, and substitute equivalents as fall within the true spirit and scope of the technology.

The invention claimed is:

1. A system comprising:
a power control module comprising:
one or more computer readable storage media;
one or more processors operatively coupled with the one or more computer readable storage media; and
program instructions stored on the one or more computer readable storage media that, when executed by the one or more processors, direct the one or more processors to at least:
receive data from a plurality of electrical devices in an industrial automation process, wherein the received data comprises a plurality of data packets are each associated with an electrical device of the plurality of electrical devices,
identify one or more data packets, from the plurality of data packets, that indicate a change in state of a corresponding electrical device from the plurality of electrical devices,
assign sequence values to the one or more data packets based on timestamps associated with the one or more data packets,
pass the data to a programmable logic controller that controls the industrial automation process, wherein the passing the data comprises sending the one or more data packets to the programmable logic controller in an order based on the assigned sequence values,
receive instructions from the programmable logic controller, and
control the plurality of electrical devices based at least in part on the instructions; and
the programmable logic controller comprising:
power control logic configured to generate the instructions for the plurality of electrical devices based on the data received from the power control module, and
process control logic configured to control one or more manufacturing devices.

2. The system of claim 1, wherein the power control logic of the programmable logic controller is further configured to:
generate high-priority instructions and low-priority instructions for the plurality of electrical devices based on the received data,
assign the high-priority instructions to a synchronous data channel between the programmable logic controller and the power control module, and
assign the low-priority instructions to an asynchronous data channel between the programmable logic controller and the power control module, wherein:
the synchronous data channel provides a higher speed of communication than the asynchronous data channel.

3. The system of claim 2, wherein the high-priority instructions comprise instructions relating to one or more of: anomalous behavior of one or more of the electrical devices, a change of state of one or more of the electrical devices, a load-shedding operation, and a main-tie-main transition operation.

4. The system of claim 1, wherein the program instructions of the power control module comprise further instructions, that upon execution by the one or more processors, cause the one or more processors to:
receive one or more instructions from a remote computing device and execute the one or more instructions on one or more of the electrical devices.

5. The system of claim 1, wherein the power control logic of the programmable logic controller is further configured to generate instructions to shed one or more electrical devices according to a shed priority of each of the plurality of electrical devices.

6. The system of claim 1, wherein:
the received instructions comprise a plurality of instruction packets, wherein each of the plurality of instruction packets:
is associated with one of the plurality of electric devices, and comprises an instruction sequence number for the associated electric device; and
the program instructions of the power control module comprise further instructions that, upon execution by the one or more processors, cause the one or more processors to:
generate a group of the plurality of instruction packets associated with a first electric device of the plurality of electric devices, and
control the first electrical device in an order according to the instruction sequence numbers in the group of instruction packets.

7. The system of claim 1, the program instructions of the power control module comprise further instructions that, upon execution by the one or more processors, cause the one or more processors to:
send electrical device data, timestamp data, and a network address of one or more of the plurality of electrical devices to the programmable logic controller.

8. A method of controlling electrical devices of an industrial automation environment, the method comprising:
in a power control module, receiving data from a plurality of electrical devices in an industrial automation process;
in the power control module, passing the data to a programmable logic controller that controls the industrial automation process;
in the power control module, receiving power control instructions from the programmable logic controller, the received power control instructions comprising a plurality of instruction packets, wherein each of the plurality of instruction packets:
is associated with one of the plurality of electrical devices, and comprises an instruction sequence number for the associated electrical device;
in the power control module, controlling the plurality of electrical devices based at least in part on the instructions, wherein the controlling comprises at least:
generating a group of the plurality of instruction packets associated with a first electrical device of the plurality of electrical devices, and
controlling the first electrical device in an order according to the instruction sequence numbers in the group of instruction packets;
in the programmable logic controller, generating power control instructions for the plurality of electrical devices based on the data received from the power control module; and
in the programmable logic controller, generating process control instructions for one or more manufacturing devices.

9. The method of controlling the electrical devices of claim 8, wherein the received data comprises a plurality of data packets, each associated with an electrical device of the plurality of electrical devices, the method further comprising;
in the power control module, identifying one or more data packets, from the plurality of data packets, that indicate a change in state of a corresponding electrical device from the plurality of electrical devices, and
in the power control module, assigning sequence values to the one or more data packets based on timestamps associated with the one or more data packets, wherein:
the passing the data comprises sending the one or more data packets to the programmable logic controller in an order based on the assigned sequence values.

10. The method of controlling the electrical devices of claim 9 further comprising, in the programmable logic controller, transmitting the data to one or more remote computing devices.

11. The method of controlling the electrical devices of claim 10, further comprising, in the power control module, receiving one or more instructions from the one or more remote computing devices and executing the one or more instructions on one or more of the plurality of electrical devices.

12. The method of controlling the electrical devices of claim 9 further comprising, in the programmable logic controller, assigning a shed priority to the plurality of electrical devices.

13. The method of controlling the electrical devices of claim 12 further comprising, in the power control module, shedding one or more of the electrical devices according to the shed priority of the plurality of electrical devices.

14. The method of controlling the electrical devices of claim 9 further comprising:
in the power control module, sending electrical device data, timestamp data, and a network address of one or more of the plurality of electrical devices to the programmable logic controller.

15. The method of controlling the electrical devices of claim 8 further comprising;
in the programmable logic controller, generating high-priority instructions and low-priority instructions for the plurality of electrical devices based on the received data,
in the programmable logic controller, assigning the high-priority instructions to a synchronous data channel between the programmable logic controller and the power control module, and
in the programmable logic controller, assigning the low-priority instructions to an asynchronous data channel between the programmable logic controller and the power control module, wherein:
the synchronous data channel provides a higher speed of communication than the asynchronous data channel.

16. The method of controlling the electrical devices of claim 15, wherein the high-priority instructions comprise instructions relating to one or more of: anomalous behavior of one or more electrical devices, a change of state of one or more electrical devices, a load-shedding operation, or a main-tie-main transition operation.

17. One or more non-transitory computer readable storage media having program instructions stored thereon that, when executed by one or more processors, direct a power control module to at least:
receive data from a plurality of electrical devices in an industrial automation process;
pass the data to a programmable logic controller that controls the industrial automation process wherein the programmable logic controller comprises:
power control logic configured to generate power control instructions based on the data, and process control logic configured to control one or more manufacturing devices;
receive the power control instructions from the programmable logic controller, the received power control instructions comprising a plurality of instruction packets, wherein each of the plurality of instruction packets:
is associated with one of the plurality of electric devices, and comprises an instruction sequence number for the associated electric device;
generate a group of the plurality of instruction packets associated with a first electrical device of the plurality of electrical devices; and
control the plurality of electrical devices based at least in part on the power control instructions, wherein the controlling comprises controlling the first electrical device in an order according to the instruction sequence numbers in the group of instruction packets.

* * * * *